United States Patent
Small

(10) Patent No.: US 11,921,184 B2
(45) Date of Patent: *Mar. 5, 2024

(54) METHODS AND APPARATUS FOR CHARACTERISING THE ENVIRONMENT OF A USER PLATFORM

(71) Applicant: Locata Corporation Pty Ltd, Bruce (AU)

(72) Inventor: David Small, Numeralla (AU)

(73) Assignee: LOCATA CORPORATION PTY LTD, Bruce (AU)

( * ) Notice: Subject to any disclaimer, the term of this patent is extended or adjusted under 35 U.S.C. 154(b) by 13 days.

This patent is subject to a terminal disclaimer.

(21) Appl. No.: 17/737,098

(22) Filed: May 5, 2022

(65) Prior Publication Data

US 2022/0268909 A1     Aug. 25, 2022

Related U.S. Application Data

(63) Continuation of application No. 16/612,755, filed as application No. PCT/AU2018/050450 on May 12, 2018, now Pat. No. 11,353,571.

(30) Foreign Application Priority Data

May 12, 2017 (AU) ................... 2017901780

(51) Int. Cl.
    *G01S 13/00*      (2006.01)
    *G01S 13/26*      (2006.01)
    *G01S 13/32*      (2006.01)

(52) U.S. Cl.
    CPC ............. *G01S 13/003* (2013.01); *G01S 13/26* (2013.01); *G01S 13/325* (2013.01)

(58) Field of Classification Search
    CPC ...... G01S 13/003; G01S 13/26; G01S 13/284; G01S 13/325; G01S 13/426; G01S 13/4445; G01S 13/4454; G01S 13/74
See application file for complete search history.

(56) References Cited

U.S. PATENT DOCUMENTS 3,842,417 A    10/1974   Williams
4,746,924 A    5/1988   Lightfoot
(Continued)

FOREIGN PATENT DOCUMENTS

CN      103969640 A    8/2014
GB      2517651 A    3/2015
(Continued)

OTHER PUBLICATIONS

Office Action issued in corresponding Japan Application No. 2019-562625 dated Feb. 2, 2022.
(Continued)

*Primary Examiner* — Timothy X Pham
(74) *Attorney, Agent, or Firm* — MATTINGLY & MALUR, PC

(57) ABSTRACT

Apparatus and methods are presented for characterising the environment of a user platform. In certain embodiments RF signals are transmitted and received through an antenna array having a plurality of elements activated in a predetermined sequence, and received signals are manipulated with round-trip path corrections to enhance the gain of the array in one or more directions. Objects in those directions are detected from the receipt of returns of transmitted signals, and the manipulated received signals processed to estimate range to those objects. In other embodiments RF signals transmitted by one or more external transmitters are received and manipulated to enhance the gain of a local antenna array or antenna arrays associated with the one or more transmitters to enhance the gain of the arrays in one or more (Continued)

directions. Objects in those directions are detected from the receipt of reflected signals from the transmitters, and the manipulated received signals processed to estimate range to those objects.

18 Claims, 13 Drawing Sheets

(56) References Cited

U.S. PATENT DOCUMENTS

| | | | |
|---|---|---|---|
| 5,252,980 | A | 10/1993 | Gray et al. |
| 5,657,021 | A | 8/1997 | Ehsani-Nategh et al. |
| 6,031,485 | A | 2/2000 | Cellai et al. |
| 8,934,844 | B2 | 1/2015 | Small |
| 9,640,865 | B2 | 5/2017 | Small |
| 2001/0013839 | A1 | 8/2001 | Wurman |
| 2002/0014985 | A1 | 2/2002 | Wurman |
| 2004/0066331 | A1 | 4/2004 | Poullin |
| 2004/0090363 | A1 | 5/2004 | Barrick |
| 2004/0145514 | A1 | 7/2004 | Raney |
| 2004/0257270 | A1 | 12/2004 | Poullin |
| 2005/0179586 | A1 | 8/2005 | Klinnert |
| 2006/0061753 | A1 | 3/2006 | Harris |
| 2006/0202885 | A1 | 9/2006 | Chen |
| 2007/0247353 | A1 | 10/2007 | Budic |
| 2007/0290930 | A1 | 12/2007 | Krishnaswamy |
| 2008/0136702 | A1 | 6/2008 | Tsuchihashi |
| 2008/0224916 | A1 | 9/2008 | Takagi |
| 2010/0033368 | A1 | 2/2010 | Ghaleb |
| 2010/0085243 | A1 | 4/2010 | De Gramont |
| 2010/0090882 | A1 | 4/2010 | Donovan |
| 2011/0057828 | A1 | 3/2011 | Brunet |
| 2012/0112953 | A1 | 5/2012 | Grau Besoli |
| 2012/0206300 | A1 | 8/2012 | Allam |
| 2013/0044023 | A1 | 2/2013 | Sanyal |
| 2013/0050024 | A1 | 2/2013 | Barott |
| 2013/0099958 | A1 | 4/2013 | Millet |
| 2013/0106645 | A1 | 5/2013 | Goodson |
| 2013/0321199 | A1 | 12/2013 | Suwa |
| 2014/0266857 | A1 | 9/2014 | Mayer |
| 2014/0285371 | A1 | 9/2014 | Abatzoglou |
| 2015/0355322 | A1 | 12/2015 | Oshima |
| 2016/0025849 | A1 | 1/2016 | Wang |
| 2016/0047883 | A1 | 2/2016 | Baker |
| 2016/0084950 | A1 | 3/2016 | Muller |

FOREIGN PATENT DOCUMENTS

| | | |
|---|---|---|
| JP | 2003-110335 W | 4/2003 |
| JP | 2004-198312 A | 7/2004 |
| JP | 2004-537041 A | 12/2004 |
| JP | 2008-151660 W | 7/2008 |
| JP | 2009-186233 W | 8/2009 |
| JP | 2014-502342 A | 1/2014 |
| KR | 20120027327 A | 3/2012 |
| WO | 02/097467 A2 | 12/2002 |

OTHER PUBLICATIONS

Examination Report issued in corresponding India Application No. 201927050316 dated Feb. 23, 2022.
Bezousek, Pavel & Schejbal, Vladimir, Bistatic and Multistatic Radar Systems, Radioengineering vol. 17(3), Sep. 2008, pp. 53-59.
Griffiths, Hugh, Biststic and Multistatic Radar, IEEE AESS Distinguihsed Lecture, ETH Zurich, Nov. 7, 2013.
Korean Office Action received in corresponding Korean Application No. 10-2019-7032998 dated Jun. 1, 2023.
Japanese Decision of Grant received in corresponding Japanese Application No. 2022-183184 dated Nov. 13, 2023.

METHODS AND APPARATUS FOR CHARACTERISING THE ENVIRONMENT OF A USER PLATFORM

RELATED APPLICATIONS

The present application claims priority from Australian provisional patent application No 2017901780, filed on 12 May 2017, the contents of which are incorporated herein by reference in their entirety.

FIELD OF THE INVENTION

The present invention relates to methods and apparatus for characterising the environment of a user platform, in particular for determining or estimating direction or range to one or more objects in the environment of a user platform such as an autonomous vehicle. However it will be appreciated that the invention is not limited to this particular field of use.

BACKGROUND OF THE INVENTION

Any discussion of the prior art throughout this specification should in no way be considered as an admission that such prior art is widely known or forms part of the common general knowledge in the field.

User platforms such as motor vehicles can be configured to operate autonomously, i.e. with little or no input from a human operator, by gathering information about the vehicle's environment to aid navigation. Information may be gathered by a variety of sensor systems including lidar, radar, cameras and microphones. Autonomous vehicles are typically also equipped with a positioning system such as GPS for determining the vehicle's position, generally for comparison with a stored map. It is generally preferable for autonomous vehicles to have multiple sensor systems for redundancy and cross-checking.

Lidar operates by repeatedly scanning one or more laser beams to generate a picture of reflective objects in the environment of a vehicle, with ranges to objects determined from the time delay between emitted pulses and returning reflected pulses. Lidar is in many ways the system of choice for detection and ranging in autonomous vehicles because of the extremely good directionality of laser beams and the ability to generate short, large bandwidth pulses for precise ranging. However as disclosed in U.S. Pat. No. 9,097,800 (Zhu) it may need to be supplemented with radar to distinguish solid objects, which may need to be avoided, from fluid objects such as exhaust plumes and tyre spray. Some shortcoming with current autonomous vehicle lidar systems are that ranges are generally limited to under 100 m, they require mechanical rotation of lasers and they do not operate well if at all in fog or heavy rain.

Several types of radar can be used in autonomous vehicles, including pulsed, frequency-modulated continuous wave (FMCW) and spread spectrum radar, see for example U.S. Pat. No. 7,969,350 (Winstead et al), U.S. Pat. No. 5,268,692 (Grosch et al) and U.S. Pat. No. 6,801,153 (Rauch et al). Pulsed radar determines range by time-of-flight techniques in similar fashion to lidar, while FMCW radar determines range by imposing a periodic frequency modulation on transmitted signals and measuring the frequency difference between the transmitted and return signals. Spread spectrum radar operates in similar fashion to GPS, determining range by imposing a pseudo-random (PRN) code on transmitted signals and correlating return signals with an internally generated replica of the PRN code. A significant shortcoming of current autonomous vehicle radar systems is a limited directional scanning ability, with most systems being fixed direction e.g. forward or rearward looking. Phased array radar systems with wide scanning ranges are used in military applications but are too complex and expensive for general use in vehicles.

Another form of radar known in the art is 'passive' radar. Unlike in 'active' radar where an apparatus both transmits and receives radio frequency (RF) energy, in passive radar a receiver attempts to determine the presence of objects in its environment by looking for reflections of signals from one or more external transmitters. In some passive radar systems the receiver and external transmitter are under joint control, whereas in 'signals of opportunity' systems the receiver uses whatever suitable signals it can find, e.g. commercial television, radio or mobile phone transmissions. Passive radar avoids the need for individual vehicles to radiate RF energy, with associated interference risks, but generally speaking the determination of detection and range is more complicated than in active radar. The vagaries of signals of opportunity has made the application of passive radar in autonomous vehicles impractical to date.

While it is important for autonomous vehicles to have several sensor systems to gather different types of information, as well as for cross-checking, it would be advantageous for reduced complexity and cost if a given sensor system could be configured to gather two or more types of information useful for navigation.

In the following description and claims the term 'or' is to be interpreted in an inclusive sense rather than an exclusive sense, unless the context clearly requires otherwise. For example the expression 'phase or gain' is to be interpreted as meaning 'phase, or gain, or both phase and gain'. The terms 'comprising', 'comprises', 'including', 'includes' and the like are to be interpreted non-exhaustively. For example the scope of the expression 'a device comprising A and B' is not limited to devices consisting only of A and B.

OBJECT OF THE INVENTION

It is an object of the present invention to overcome or ameliorate at least one of the disadvantages of the prior art, or to provide a useful alternative. It is an object of the present invention in a preferred form to provide an improved method and apparatus for characterising the environment of a user platform. It is an object of the present invention in another preferred form to provide a multiple-access method that enables a plurality of user platforms to characterise their environment using receivers equipped with simple antennas, receiving signals from one or more external transmitters.

SUMMARY OF THE INVENTION

According to a first aspect of the present invention there is provided a method for characterising the environment of a user platform, said method comprising the steps of:
  generating a signal;
  transmitting said signal through spatially distributed antenna elements of an antenna array, said antenna elements being activated in a predetermined sequence for transmitting or receiving signals;
  applying to incoming signals received through the sequentially activated antenna elements, in substantial synchronisation with said predetermined sequence, phase or gain manipulations incorporating round-trip path corrections for said antenna array and selected for forming a reciprocal beam of said antenna array in a predetermined direction;

accumulating the manipulated incoming signals over an integration period to form said reciprocal beam; and inferring the presence of an object in said predetermined direction based on the detection in said reciprocal beam of a return of the transmitted signal.

The phase or gain manipulations are preferably applied to the incoming signals in substantial synchronisation with the predetermined sequence, and in substantial synchronisation with expected periods of receipt of a return signal. In certain embodiments the integration period is divided into a number of sub-integration periods that are determined by the overlap of the expected periods of receipt of a return signal and the activation periods of the antenna elements.

Preferably, the detection of the return of the transmitted signal comprises correlating incoming signals against a replica of a code used to encode the transmitted signal.

Preferably, the method further comprises the steps of: receiving a local signal obtained internally from the generated signal being transmitted; and tracking the local signal in a first channel to determine a baseline for a measurement of range to the inferred object.

In certain embodiments the method further comprises the steps of: correlating, in a plurality of taps at a series of delays in the first channel, incoming signals against a replica of a code used to encode the transmitted signal, to determine a plurality of correlation values; identifying a maximum correlation value from the plurality of correlation values; and determining, from a separation between the baseline and the maximum correlation value, a measure related to range to the inferred object.

In other embodiments the method further comprises the steps of: correlating, in a plurality of taps at a series of delays in one or more channels that are slaved to the first channel, incoming signals against a replica of a code used to encode the transmitted signal, to determine a plurality of correlation values; identifying a maximum correlation value from the plurality of correlation values; and determining, from a separation between the baseline and the maximum correlation value, a measure related to range to the inferred object.

Preferably, the local signal is accumulated during periods when the generated signal is being transmitted, and the manipulated incoming signals are accumulated during periods when the generated signal is not being transmitted.

According to a second aspect of the present invention there is provided an apparatus for characterising the environment of a user platform, said apparatus comprising:

an antenna array having a plurality of spatially distributed antenna elements;

a switching network for activating said antenna elements in a predetermined sequence for transmitting or receiving signals;

a transmitter operatively associated with said antenna array for generating a signal and transmitting said signal through the sequentially activated antenna elements; and a receiver operatively associated with said antenna array for:

receiving incoming signals through said sequentially activated antenna elements;

applying phase or gain manipulations to received incoming signals in substantial synchronisation with said predetermined sequence, said phase or gain manipulations incorporating round-trip path corrections for said antenna array and being selected for forming a reciprocal beam of said antenna array in a predetermined direction;

accumulating the manipulated incoming signals over an integration period to form said reciprocal beam; and inferring the presence of an object in said predetermined direction based on the detection in said reciprocal beam of a return of the transmitted signal.

The receiver is preferably adapted to apply the phase or gain manipulations to the incoming signals in substantial synchronisation with the predetermined sequence, and in substantial synchronisation with expected periods of receipt of a return signal. In certain embodiments the integration period is divided into a number of sub-integration periods that are determined by the overlap of the expected periods of receipt of a return signal and the activation periods of the antenna elements.

Preferably, the receiver comprises a correlator for correlating incoming signals against a replica of a code used to encode the transmitted signal, for the detection of the return of the transmitted signal.

The receiver is preferably adapted to: receive a local signal obtained internally from the generated signal being transmitted; and track the local signal in a first channel to determine a baseline for a measurement of range to the inferred object.

In certain embodiments the receiver is adapted to: correlate, in a plurality of taps at a series of delays in the first channel, incoming signals against a replica of a code used to encode the transmitted signal, to determine a plurality of correlation values; identify a maximum correlation value from the plurality of correlation values; and determine, from a separation between the baseline and the maximum correlation value, a measure related to range to the inferred object.

In other embodiments the receiver is adapted to: correlate, in a plurality of taps at a series of delays in one or more channels that are slaved to the first channel, incoming signals against a replica of a code used to encode the transmitted signal, to determine a plurality of correlation values; identify a maximum correlation value from the plurality of correlation values; and determine, from a separation between the baseline and the maximum correlation value, a measure related to range to the inferred object.

Preferably, the receiver is adapted to accumulate the local signal during periods when the generated signal is being transmitted, and accumulate the manipulated incoming signals during periods when the generated signal is not being transmitted.

According to a third aspect of the present invention there is provided a method for forming a reciprocal beam at an antenna array, said method comprising the steps of:

generating a signal;

transmitting said signal through spatially distributed antenna elements of said antenna array, said antenna elements being activated in a predetermined sequence for transmitting or receiving signals;

applying to incoming signals received through the sequentially activated antenna elements, in substantial synchronisation with said predetermined sequence, phase or gain manipulations incorporating round-trip path corrections for said antenna array and selected for forming a reciprocal beam of said antenna array in a predetermined direction; and accumulating the manipulated incoming signals over an integration period to form said reciprocal beam.

According to a fourth embodiment of the present invention there is provided an apparatus for forming a reciprocal beam at an antenna array, said apparatus comprising:
- an antenna array having a plurality of spatially distributed antenna elements;
- a switching network for activating said antenna elements in a predetermined sequence for transmitting or receiving signals;
- a transmitter operatively associated with said antenna array for generating a signal and transmitting said signal through the sequentially activated antenna elements; and
- a receiver operatively associated with said antenna array for:
  - receiving incoming signals through said sequentially activated antenna elements;
  - applying phase or gain manipulations to received incoming signals in substantial synchronisation with said predetermined sequence, said phase or gain manipulations incorporating round-trip path corrections for said antenna array and being selected for forming a reciprocal beam of said antenna array in a predetermined direction; and
  - accumulating the manipulated incoming signals over an integration period to form said reciprocal beam.

According to a fifth aspect of the present invention there is provided a method for characterising the environment of a user platform using signals transmitted from a physically separate transmitter, said method comprising the steps of:
- selectively activating spatially distributed antenna elements of an antenna array in a predetermined sequence for receiving signals;
- applying to received incoming signals, in substantial synchronisation with said predetermined sequence, a first set of phase or gain manipulations selected for forming a beam in a predetermined direction from said antenna array;
- accumulating the manipulated incoming signal over an integration period to form said beam; and
- inferring the presence of an object in said predetermined direction based on the detection in said beam of a reflected signal from said physically separate transmitter.

The detection of the reflected signal preferably comprises correlating incoming signals against a replica of a code used to encode the transmitted signals.

Preferably, the method further comprises the steps of: applying to received incoming signals, in substantial synchronisation with the predetermined sequence, a second set of phase or gain manipulations selected for forming a direct path beam in the direction of the physically separate transmitter; accumulating the manipulated incoming signal over an integration period to form the direct path beam; and tracking, in a first channel, a direct path signal received from the direction of the direct path beam to determine a time of arrival of the direct path signal.

In certain embodiments the method further comprises the steps of: tracking the reflected signal in a second channel to determine a time of arrival of the reflected signal; and differencing the times of arrival of the reflected and direct path signals to obtain a measure related to range to the inferred object. In other embodiments the method further comprises the steps of: correlating, in a plurality of taps at a series of delays in one or more channels that are slaved to the first channel, incoming signals against a replica of a code used to encode the transmitted signals, to determine a plurality of correlation values; identifying a maximum correlation value from the plurality of correlation values to determine a time of arrival of the reflected signal; and determining, from a separation between the times of arrival of the reflected and direct path signals, a measure related to range to the inferred object.

According to a sixth aspect of the present invention there is provided an apparatus for characterising the environment of a user platform using signals transmitted from a physically separate transmitter, said apparatus comprising:
- an antenna array having a plurality of spatially distributed antenna elements;
- a switching network for activating said antenna elements in a predetermined sequence for receiving signals; and
- a receiver for:
  - receiving incoming signals through the sequentially activated antenna elements;
  - applying to received incoming signals, in substantial synchronisation with said predetermined sequence, a first set of phase or gain manipulations selected for forming a beam in a predetermined direction from said antenna array;
  - accumulating the manipulated received signal over an integration period to form said beam; and
  - inferring the presence of an object in said predetermined direction based on the detection in said beam of a reflected signal from said physically separate transmitter.

Preferably, the receiver comprises a correlator for correlating incoming signals against a replica of a code used to encode the transmitted signals, for the detection of the reflected signal.

The receiver is preferably adapted to: apply to received incoming signals, in substantial synchronisation with the predetermined sequence, a second set of phase or gain manipulations selected for forming a direct path beam in the direction of the physically separate transmitter; accumulate the manipulated incoming signals over an integration period to form the direct path beam; and track, in a first channel, a direct path signal received from the direction of the direct path beam to determine a time of arrival of the direct path signal.

In certain embodiments the receiver is adapted to: track the reflected signal in a second channel to determine a time of arrival of the reflected signal; and difference the times of arrival of the reflected and direct path signals to obtain a measure related to range to the inferred object. In other embodiments the receiver is adapted to: correlate, in a plurality of taps at a series of delays in one or more channels that are slaved to the first channel, incoming signals against a replica of a code used to encode the transmitted signals, to determine a plurality of correlation values; identify a maximum correlation value from the plurality of correlation values to determine a time of arrival of the reflected signal; and determine, from a separation between the times of arrival of the reflected and direct path signals, a measure related to range to the inferred object.

According to a seventh aspect of the present invention there is provided a method for characterising the environment of a user platform using signals transmitted from spatially distributed antenna elements of a physically separate antenna array, said antenna elements being activated, for transmitting signals, in a predetermined sequence with which the transmitted signals are synchronised, said method comprising the steps of:
- applying to incoming signals, at a receiver, in substantial synchronisation with the receipt of a signal transmitted from the sequentially activated antenna elements, a first set of phase or gain manipulations selected for forming a beam in a predetermined direction from said physically separate antenna array, wherein said predetermined sequence and its synchronisation with said transmitted signals are known to said receiver;

accumulating the manipulated incoming signals over an integration period to form said beam; and inferring the presence of an object in said predetermined direction from said physically separate antenna array based on the detection in said beam of a reflected signal from said spatially distributed antenna elements.

Preferably, the detection of the reflected signal comprises correlating incoming signals against a replica of a code used to encode the transmitted signals.

Preferably, the method further comprises the steps of: applying to incoming signals, at the receiver, in substantial synchronisation with the receipt of a signal transmitted from the sequentially activated antenna elements, a second set of phase or gain manipulations selected for forming a direct path beam pointing from the antenna array towards the receiver; accumulating the manipulated incoming signals over an integration period to form the direct path beam; and tracking, in a first channel of the receiver, a direct path signal received from the direction of the direct path beam to determine a time of arrival of the direct path signal.

In certain embodiments the method further comprises the steps of: tracking the reflected signal in a second channel of the receiver to determine a time of arrival of the reflected signal; and differencing the times of arrival of the reflected and direct path signals to obtain a measure related to range to the inferred object. In other embodiments the method further comprises the steps of: correlating, in a plurality of taps at a series of delays in one or more channels that are slaved to the first channel, incoming signals against a replica of a code used to encode the transmitted signals, to determine a plurality of correlation values; identifying a maximum correlation value from the plurality of correlation values to determine a time of arrival of the reflected signal; and determining, from a separation between the times of arrival of the reflected and direct path signals, a measure related to range to the inferred object.

According to an eighth aspect of the present invention there is provided an apparatus for characterising the environment of a user platform using signals transmitted from spatially distributed antenna elements of a physically separate antenna array, said antenna elements being activated, for transmitting signals, in a predetermined sequence with which the transmitted signals are synchronised, said apparatus comprising a receiver for:

applying to incoming signals, in substantial synchronisation with the receipt of a signal transmitted from the sequentially activated antenna elements, a first set of phase or gain manipulations selected for forming a beam in a predetermined direction from said physically separate antenna array, wherein said predetermined sequence and its synchronisation with said transmitted signals are known to said receiver;

accumulating the manipulated incoming signals over an integration period to form said beam; and inferring the presence of an object in said predetermined direction from said physically separate antenna array based on the detection in said beam of a reflected signal from said spatially distributed antenna elements.

Preferably, the receiver comprises a correlator for correlating incoming signals against a replica of a code used to encode the transmitted signals, for the detection of the reflected signal.

Preferably, the receiver is adapted to: apply to incoming signals, in substantial synchronisation with the receipt of a signal transmitted from the sequentially activated antenna elements, a second set of phase or gain manipulations selected for forming a direct path beam pointing from the antenna array towards the receiver; accumulate the manipulated incoming signals over an integration period to form the direct path beam; and track, in a first channel, a direct path signal received from the direction of said direct path beam to determine a time of arrival of the direct path signal.

In certain embodiments the receiver is adapted to: track the reflected signal in a second channel to determine a time of arrival of the reflected signal; and difference the times of arrival of the reflected and direct path signals to obtain a measure related to range to the inferred object. In other embodiments the receiver is adapted to: correlate, in a plurality of taps at a series of delays in one or more channels that are slaved to the first channel, incoming signals against a replica of a code used to encode the transmitted signals, to determine a plurality of correlation values; identify a maximum correlation value from the plurality of correlation values to determine a time of arrival of the reflected signal; and determine, from a separation between the times of arrival of the reflected and direct path signals, a measure related to range to the inferred object.

According to a ninth aspect of the present invention there is provided a method for characterising the environment of a user platform using signals transmitted from spatially distributed transmit antenna elements of a physically separate transmit antenna array, said transmit antenna elements being activated, for transmitting signals, in a second predetermined sequence with which the transmitted signals are synchronised, said method comprising the steps of:

selectively activating spatially distributed receive antenna elements of a receive antenna array in a first predetermined sequence for receiving signals;

applying to incoming signals, at a receiver, a first set of phase or gain manipulations having transmit and receive components selected for forming a composite beam pointing in a predetermined transmit direction from said physically separate transmit antenna array and in a predetermined receive direction from said receive antenna array, said transmit components being applied in substantial synchronisation with the receipt of a signal transmitted from the sequentially activated transmit antenna elements and said receive components being applied in substantial synchronisation with said first predetermined sequence, said second predetermined sequence and its synchronisation with said transmitted signals being known to said receiver;

accumulating the manipulated incoming signals over an integration period to form said composite beam; and inferring the presence of an object in said predetermined receive direction based on the detection in said composite beam of a reflected signal transmitted from said spatially distributed transmit antenna elements.

The detection of the reflected signal preferably comprises correlating incoming signals against a replica of a code used to encode the transmitted signals.

Preferably, the method further comprises the steps of: applying to incoming signals, at the receiver, a second set of phase or gain manipulations having transmit and receive components selected for forming a direct path composite beam between the transmit antenna array and the receive antenna array, the transmit components being applied in substantial synchronisation with the receipt of a signal transmitted from the sequentially activated transmit antenna elements and the receive components being applied in substantial synchronisation with the first predetermined sequence; accumulating the manipulated incoming signals over an integration period to form the direct path composite beam; and tracking, in a first channel of the receiver, a direct path signal received from the direction of the direct path composite beam to determine a time of arrival of the direct path signal.

In certain embodiments the method further comprises the steps of: tracking the reflected signal in a second channel of the receiver to determine a time of arrival of the reflected signal; and differencing the times of arrival of the reflected and direct path signals to obtain a measure related to range to the inferred object. In alternative embodiments the method further comprises the steps of: correlating, in a plurality of taps at a series of delays in one or more channels that are slaved to the first channel, incoming signals against a replica of a code used to encode the transmitted signals, to determine a plurality of correlation values; identifying a maximum correlation value from the plurality of correlation values to determine a time of arrival of the reflected signal; and determining, from a separation between the times of arrival of the reflected and direct path signals, a measure related to range to the inferred object.

According to a tenth aspect of the present invention there is provided an apparatus for characterising the environment of a user platform using signals transmitted from spatially distributed transmit antenna elements of a physically separate transmit antenna array, said transmit antenna elements being activated, for transmitting signals, in a second predetermined sequence with which the transmitted signals are synchronised, said apparatus comprising:
  a receive antenna array having a plurality of spatially distributed receive antenna elements;
  a switching network for activating said receive antenna elements in a first predetermined sequence for receiving signals; and
  a receiver for:
  receiving incoming signals through the sequentially activated receive antenna elements;
  applying, to received incoming signals, a first set of phase or gain manipulations having transmit and receive components selected for forming a composite beam pointing in a predetermined transmit direction from said physically separate transmit antenna array and in a predetermined receive direction from said receive antenna array, said transmit components being applied in substantial synchronisation with the receipt of a signal transmitted from the sequentially activated transmit antenna elements and said receive components being applied in substantial synchronisation with said first predetermined sequence, said second predetermined sequence and its synchronisation with said transmitted signals being known to said receiver;
  accumulating the manipulated incoming signals over an integration period to form said composite beam; and
  inferring the presence of an object in said predetermined receive direction based on the detection in said composite beam of a reflected signal from said spatially distributed transmit antenna elements.

Preferably, the receiver comprises a correlator for correlating incoming signals against a replica of a code used to encode the transmitted signals, for the detection of the reflected signal.

In preferred embodiments the receiver is adapted to: apply to incoming signals, at the receiver, a second set of phase or gain manipulations having transmit and receive components selected for forming a direct path composite beam between the transmit antenna array and the receive antenna array, the transmit components being applied in substantial synchronisation with the receipt of a signal transmitted from the sequentially activated transmit antenna elements and the receive components being applied in substantial synchronisation with the first predetermined sequence; accumulating the manipulated incoming signals over an integration period to form the direct path composite beam; and tracking, in a first channel of the receiver, a direct path signal received from the direction of the direct path composite beam to determine a time of arrival of the direct path signal.

In certain embodiments the receiver is adapted to: track the reflected signal in a second channel of the receiver to determine a time of arrival of the reflected signal; and difference the times of arrival of the reflected and direct path signals to obtain a measure related to range to the inferred object. In alternative embodiments the receiver is adapted to: correlate, in a plurality of taps at a series of delays in one or more channels that are slaved to the first channel, incoming signals against a replica of a code used to encode the transmitted signals, to determine a plurality of correlation values; identify a maximum correlation value from the plurality of correlation values to determine a time of arrival of the reflected signal; and determine, from a separation between the times of arrival of the reflected and direct path signals, a measure related to range to the inferred object.

BRIEF DESCRIPTION OF THE DRAWINGS

Preferred embodiments of the invention will now be described, by way of example only, with reference to the accompanying drawings, in which.

DETAILED DESCRIPTION

Embodiments with Reciprocal Beam Forming

Figure 1:
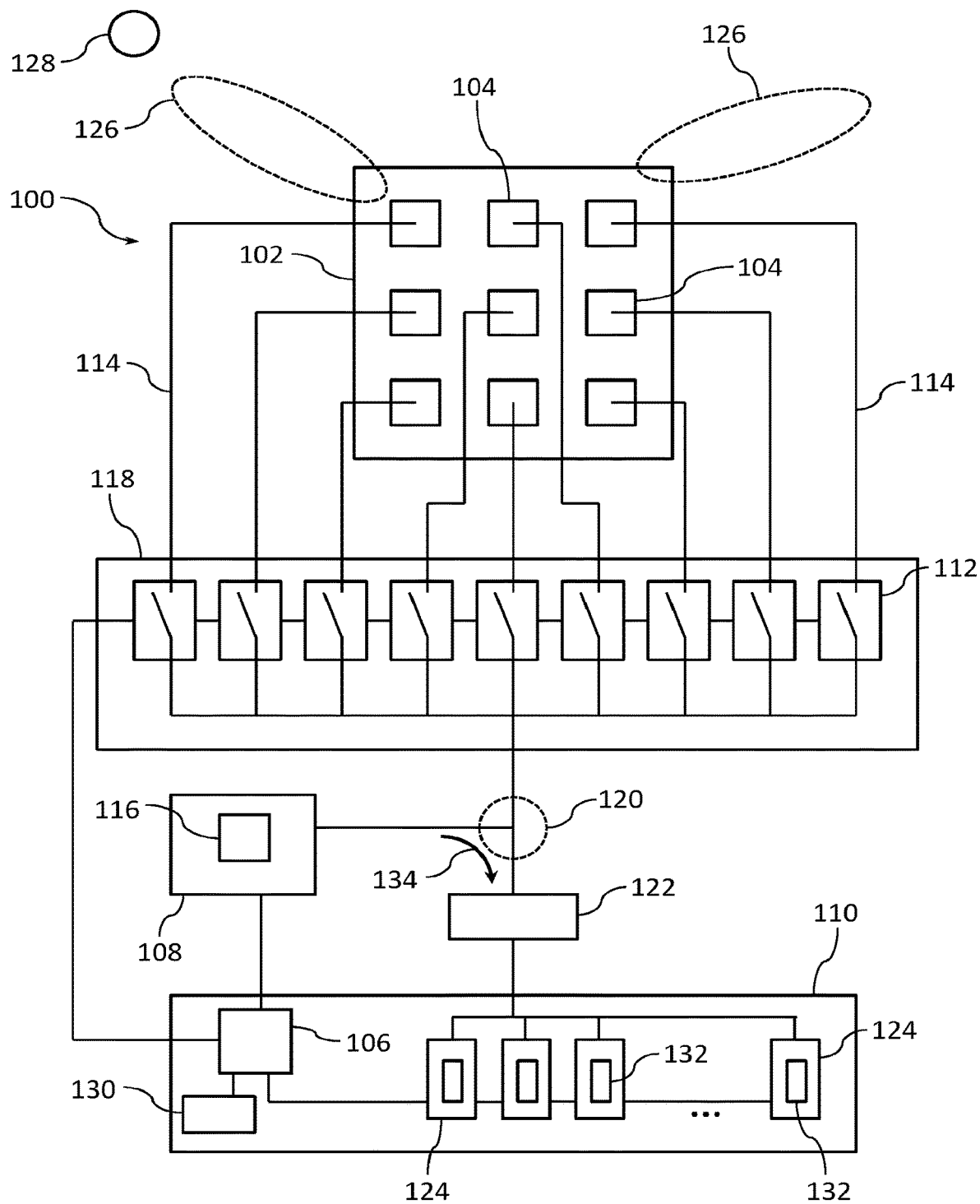
FIG. 1 shows a block diagram of an apparatus configured to transmit and receive signals for characterising an environment, according to an embodiment of the invention.

Certain aspects of the present invention concern apparatus and methods for characterising the environment of a user platform such as an autonomous vehicle. FIG. 1 depicts in schematic form an apparatus 100 comprising an antenna array 102 having a plurality of spatially distributed antenna elements 104, a processor 106, a transmitter 108 and a receiver 110. The processor 106 is configured to switch, via a switching network 118 and transmission lines 114, the antenna elements 104 between first and second states in a predetermined sequence wherein, in the first state, the antenna elements are configured to transmit or receive signals, and in the second state the antenna elements are configured not to transmit or receive signals. In other words, the processor 106 is configured to activate the antenna elements 104 in a predetermined sequence for transmitting or receiving signals. In the embodiment illustrated in FIG. 1 the antenna array 102 has nine microstrip patch antenna elements 104 arranged in a plane, activated and deactivated with a switching network 118 comprising nine single pole switches 112. Many other configurations are possible, e.g. with different types, numbers or arrangements of antenna elements, or different switching networks. For example a switching network for the illustrated array of nine antenna elements 104 could comprise a single 1×9 switch or a tree structure of 1×3 switches. Although it is preferred for no more than one antenna element to be active at any given time, in certain embodiments two or more antenna elements may be active simultaneously. The processor 106 may exclude one or more antenna elements 104 from the predetermined sequence, and there is no necessity for the antenna element activation periods to be of equal duration. As the elements 104 in the array 102 are activated in turn according to the predetermined sequence they will, in the absence of parasitics or mutual coupling from other elements, transmit or receive RF energy according to their intrinsic gain patterns. In preferred embodiments the antenna elements 104 are configured such that, when inactive, they are or can be made substantially non-resonant with active antenna elements.

The transmitter 108 is operatively associated with the antenna array 102 and the processor 106. In preferred embodiments it comprises an RF amplifier/modulator 116 including an RF carrier generator and a PRN code generator and is configured to generate a PRN-encoded signal for transmission through the sequentially activated antenna elements 104. The receiver 110 is likewise operatively associated with the antenna array 102 and the processor 106 and is configured to receive, through the sequentially activated elements 104, return signals formed by reflection of the transmitted signal from one or more objects 128 in the environment of the apparatus 100. Received signals are typically downconverted to intermediate frequency (IF) in an RF front end 122 then processed in one or more channels 124 of the receiver 110. Each channel has one or more correlators 132 for correlating received signals with internally generated replicas of the PRN code used to encode the transmitted signal, as is known in the art of spread spectrum signal processing.

The apparatus 100 includes a junction 120 that allows operation in transmit or receive mode by directing RF energy from the transmitter 108 to the antenna array 102 for transmission, or directing signals received through the antenna array 102 to the receiver 110. In certain embodiments the junction 120 comprises a passive component such as an RF circulator or a 180 degree hybrid coupler that allows the apparatus 100 to transmit and receive signals simultaneously. In other embodiments the junction 120 comprises an active component such as an RF switch that toggles the apparatus between transmit and receive modes. Whatever the form of the junction 120, the port isolation will generally be imperfect resulting in a signal 134, commonly known as a 'leakage' or 'feedthrough' signal, that leaks from the transmitter 108 to the receiver 110. Impedance mismatches may result in additional fractions of the RF energy generated by the transmitter being back-reflected from the switches 112 or antenna elements 104 and reaching the receiver.

Leakage signals are generally regarded as deleterious in radar systems and several methods for cancelling such signals are known in the art, disclosed for example in U.S. Pat. No. 3,021,521 (Hutchins) and U.S. Pat. No. 6,801,153. Essentially the same problem of 'self-interference' is addressed in the field of full duplex radio, see for example Bharadia et al 'Full duplex radios', Proc SIGCOMM'13, 12-16 Aug. 2013, Hong Kong, pp. 375-386. In the present invention however the leakage signal is advantageously tracked in a tracking loop to provide a baseline pseudorange measurement for differencing against returns of the transmitted signal obtained via reflection from objects 128 in the environment. These leakage signals will be referred to hereinafter as 'local' signals.

To characterise the environment the apparatus 100 enhances the gain of the antenna array 102 in one or more directions, i.e. forms one or more beams 126 for transmission or reception of RF energy, looking for reflections of the transmitted signal from objects 128. In preferred embodiments, to form a beam the receiver 110 is configured to apply in a channel 124, with appropriate timing as discussed below, an appropriate set of phase or gain manipulations to incoming signals received through the sequentially activated antenna elements 104. The manipulated signal segments are then accumulated in one or more registers, known as accumulators, in the channel 124 over an integration period to form the required beam 126. Generally, the integration period will correspond to one or more complete cycles of the predetermined sequence, which may for example be 100 µs in duration. Notably, multiple beams 126 can be formed simultaneously by manipulating and accumulating received signal segments in multiple channels 124.

As explained in U.S. Pat. No. 8,934,844 (Small), the contents of which are incorporated herein in their entirety, the phase or gain of received signal segments can be manipulated conveniently in a modified spread spectrum correlation process. The required phase or gain manipulations are applied to a reference signal, preferably a carrier reference signal, generated in one or more correlators 132 in one or more receive channels 124, then transferred to the received signal segments when the signal segments are mixed with the reference signal as part of the usual correlation process. Importantly, the inherent coherence of the correlation process ensures that the manipulated signal segments can be accumulated coherently over an integration period to form a beam.

Generally, the range of directions in which beams can be formed with a given antenna array depends on the type and arrangement of the elements in the array. The antenna array 102 shown in FIG. 1, for example, with a planar array of antenna elements 104, is able to form beams in a hemispherical volume above the plane of the elements. In preferred embodiments the antenna array 102 is able to form beams in substantially any direction in three-dimensional space, with particular attention paid to the full 360° horizontal plane of primary interest for autonomous vehicles. This may be achieved for example with an array of antenna elements arranged on a spherical surface. In one particular embodiment an antenna array 102 comprises eighty antenna elements 104 arranged on a spherical surface, with each element activated once for a 1.25 µs period in a 100 µs predetermined sequence. In another embodiment an array comprises sixty elements arranged on a spherical surface, with each element activated once for a 1.67 µs period in a 100 µs predetermined sequence.

The beams 126 and their formation process are to be distinguished from those described in U.S. Pat. No. 8,934,844 whereby a receiver manipulates signals from an external transmitter received through a local antenna array to influence the gain pattern. The beams 126 and their formation process are also to be distinguished from the 'composite beams' described in U.S. Pat. No. 9,640,865 (Small), the contents of which are incorporated herein in their entirety, whereby a receiver manipulates received signal segments to influence the gain pattern at a remote, physically separate 'transmit' antenna array as well as at its local 'receive' antenna array. A distinguishing feature of the present invention is the ability of the apparatus 100 to transmit and receive RF signals using a single antenna array 102, and subsequently apply phase or gain manipulations incorporating round-trip path corrections to received incoming signals to form one or more beams 126 for detection of objects 128 in the vicinity, for mapping or characterising the local environment. This has the added advantage of allowing the apparatus 100 a completely autonomous mode of operation, without needing to be in proximity of a positioning network. The terminology 'reciprocal beam' is used hereinafter to refer to beams 126 produced in this embodiment of the present invention, to distinguish them from beams formed purely for transmission or reception of RF energy through an antenna array.

Figure 2:
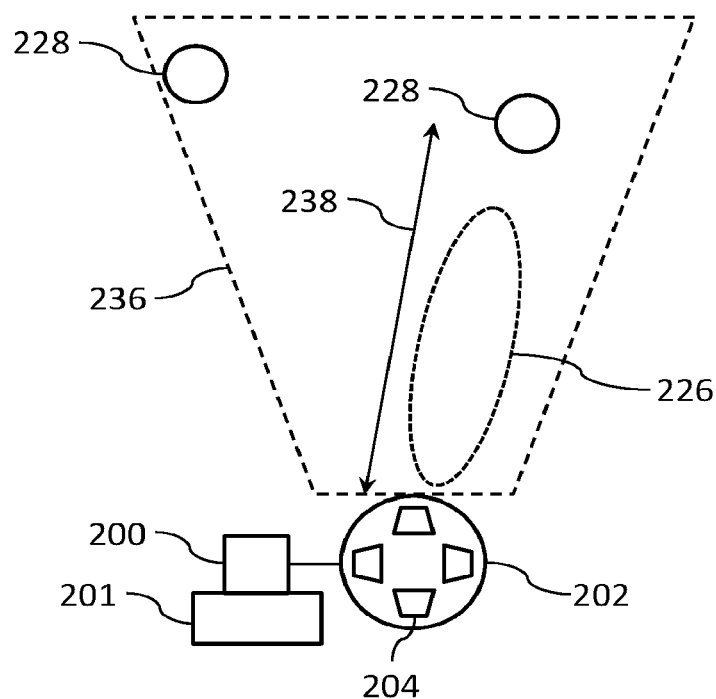
FIG. 2 shows in schematic form an apparatus forming a reciprocal beam for characterising the environment of an associated user platform.

In a simple embodiment, illustrated schematically in FIG. 2, an apparatus 200 carried by or incorporated in a user platform 201 is configured to form a single reciprocal beam 226 at a multi-element antenna array 202 in the form of a spherical array with a plurality of individually switchable antenna elements 204. This reciprocal beam can be swept through a required monitoring zone 236 by systematically varying the phase or gain manipulations applied to signal segments received through the sequentially activated elements 204 within an integration period. The presence of objects 228 can then be inferred by detecting returns of the transmitted signal, which are distinguished from other incoming signals by correlating received incoming signals against replicas of the PRN code used to encode the transmitted signal. For example the presence of an object in a given beam direction may be inferred from the appearance of non-negligible correlation power. A measure related to range 238 to an inferred object can then be obtained by further processing of the accumulated signal as described below. Typically the round-trip propagation delay is measured, which can be converted to range by multiplying by the speed of light and dividing by two.

Figure 3:
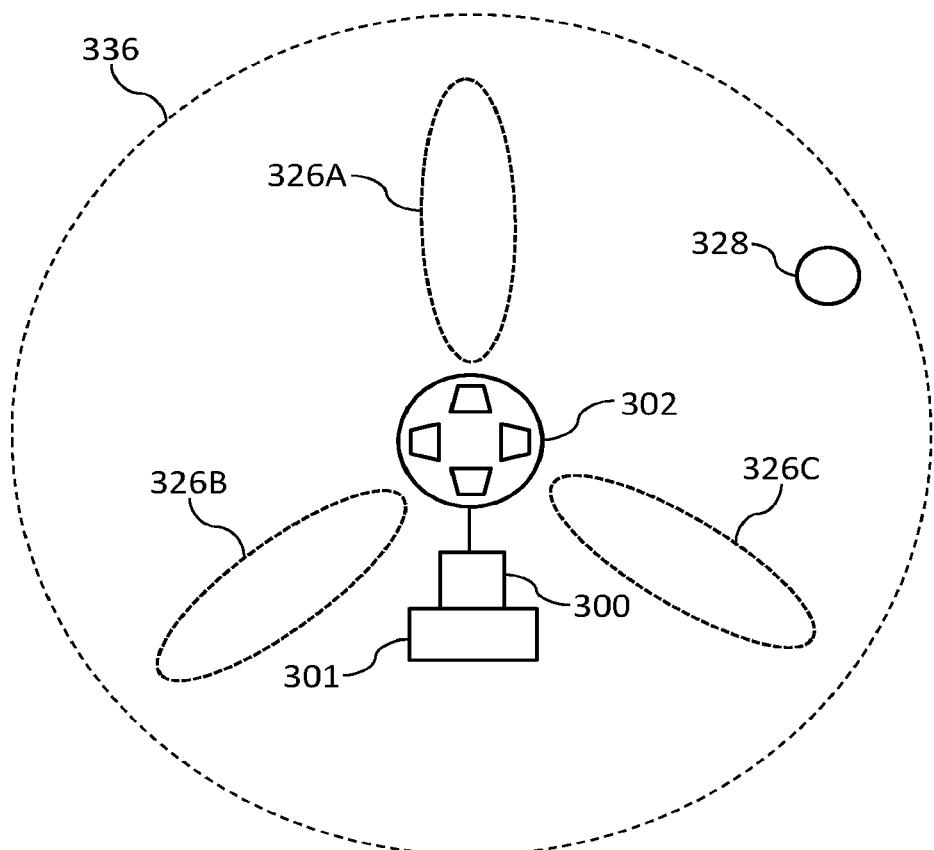
FIG. 3 shows in schematic form an apparatus forming simultaneously a plurality of reciprocal beams for characterising the environment of an associated user platform.

In preferred embodiments the apparatus is configured to form a plurality of reciprocal beams simultaneously. In the embodiment illustrated in FIG. 3 an apparatus 300 carried by or incorporated in a user platform 301 is configured with sufficient channels to form three reciprocal beams 326A, 326B and 326C at a spherical antenna array 302 having a plurality of individually switchable antenna elements 304. Each reciprocal beam may for example be swept through an appropriate sector of a required monitoring zone 336 for detecting objects 328. A larger number of beams will enable a given monitoring zone 336 to be scanned more rapidly, and in certain embodiments the apparatus 300 may be configured to form tens, hundreds or even thousands of reciprocal beams simultaneously depending on the availability of sufficient receive channels and processing power. In a particularly preferred embodiment the number of beams formed is sufficient to provide complete coverage of a required monitoring zone 336 without beam sweeping. Employing tighter beams, e.g. by equipping the apparatus with a larger antenna array with more elements, will generally improve the angular resolution. This improved resolution comes at the expense of needing more beams for complete instantaneous coverage of a monitoring zone, requiring more receive channels and associated processor power.

Figure 4:
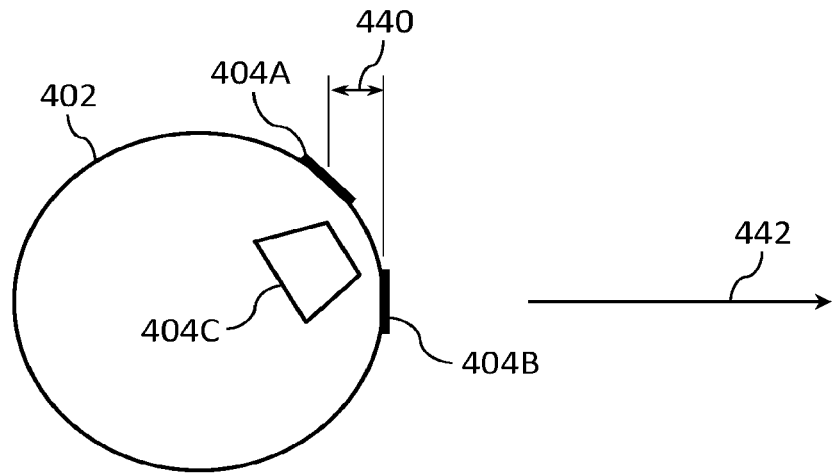
FIG. 4 illustrates in schematic form selected elements of a spherical antenna array.

To explain the concept of a 'reciprocal beam', FIG. 4 shows three selected antenna elements 404A, 404B and 404C of a spherical antenna array 402 configured to transmit and receive RF signals. In this particular example the distance 440 between elements 404A and 404B in a direction of interest 442 happens to be equal to $\lambda/8$ where $\lambda$ is the signal wavelength. If a 'transmit' or 'receive' beam in isolation were to be formed in this direction 442, it would suffice to apply a phase delay of $\lambda/8$ to signals being transmitted or received through element 404B relative to signals being transmitted or received through element 404A. However because received signal segments are to be manipulated to enhance the gain in the selected direction 442 in both transmission and reception, it is necessary to apply a relative phase delay of $\lambda/4$ (i.e. $\lambda/8+\lambda/8$) to signals received through element 404B. For ease of understanding the resulting directional gain enhancement may be thought of as a transmit beam combined with a receive beam, although it should be stressed that this is misrepresentative of the true nature of a reciprocal beam where round-trip path corrections are applied in a single set of phase or gain manipulations.

To form a reciprocal beam correctly it is necessary to apply the phase or gain manipulations to received signal segments in substantial synchronisation with the predetermined sequence with which the antenna elements are activated. More preferably, the phase or gain manipulations are also applied in substantial synchronisation with the expected periods of receipt of return signals, which requires consideration of expected range to an object. To explain with reference to FIG. 4, because the antenna elements 404A, 404B etc are activated in sequence a signal segment transmitted from a given antenna element and reflected from an object will be received, at least in part, through a different antenna element. Consequently the pairing of antenna elements through which a signal is transmitted and received, and therefore the values of the phase or gain manipulations and the timing with which they should be applied to the received signal segments, depends on the range to an object being detected. For example if antenna elements 404A, 404B, 404C etc are each activated in sequence for 1.25 µs a signal transmitted from element 404A and reflected off an object less than 188 m away will be received partially at element 404A and partially at element 404B, recalling that the round-trip distance is twice the range. Similarly, the signal will be received at elements 404B and 404C if it reflects off an object between 188 m and 375 m away, and so on.

If the antenna element activation periods in the predetermined sequence are long compared to the expected round-trip propagation delay for a range of interest, e.g. 20 µs activation periods compared to expected delays of ~200 ns, i.e. ranges around 30 m, this effect can be safely ignored. Return signals will be received predominantly through the antenna elements from which they were transmitted, and the phase or gain manipulations can be calculated and applied with consideration of the antenna element activation sequence alone. The receiver can decide whether to take expected return signal reception times into account based on knowledge of the element activation periods and the ranges of interest.

Apart from the predetermined antenna element activation sequence and the expected range-related delay of return signals, other factors required for determining the appropriate phase or gain manipulations include the directions in which the antenna array gain is to be enhanced, i.e. the required beam direction, the type and orientation of the antenna array 402 and the position of each element 404A, 404B etc in the array. In certain embodiments the required phase or gain manipulations for forming a reciprocal beam in a given direction are determined by the processor 106 in real time, while in other embodiments the processor retrieves the required phase or gain manipulations from a database 130. The phase or gain manipulations may also be referred to as 'phase or gain coefficients', 'antenna coefficients' or 'reciprocal beam coefficients'.

In preferred embodiments the phase or gain of signals being transmitted from the antenna elements 104 of an array 102 is set to unity, i.e. with no phase or gain manipulations being applied at the transmitter. Instead, all of the phase or gain manipulations required to form a reciprocal beam are applied to the received return signals. For completeness we note that a reciprocal beam could be formed in a certain direction by applying at the transmitter 108, and in substantial synchronisation with the predetermined antenna element activation sequence, appropriate reciprocal phase or gain manipulations to the signal segments being transmitted, and accumulating those segments after reception and regular correlator processing at the receiver 110. However an apparatus 100 forming a reciprocal beam in this manner is constrained to forming only one such beam at a time, which is an undesirable limitation. It would be possible for the receiver 110 to apply appropriate phase or gain manipulations, in substantial synchronisation with the predetermined sequence, that 'unwind' the manipulations applied by the transmitter 108 and form reciprocal beams in one or more directions simultaneously. In any event it is generally easier to apply phase or gain manipulations to received signals than to signals being transmitted, so the design of the apparatus 100 is considerably simplified when phase or gain manipulations are applied only to received signals. In short, there is usually little advantage in forming reciprocal beams by applying phase or gain manipulations at the transmitter.

Figure 5:
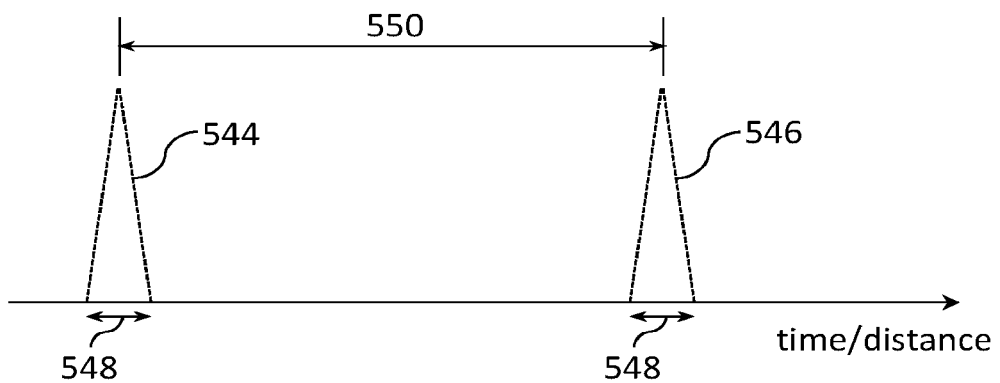
FIG. 5 shows in schematic form an output of a correlator processing spread spectrum signals, according to an embodiment of the invention.

As discussed previously, a receiver 110 will typically receive a 'local' signal obtained internally by leakage 134 of the generated signal at the junction 120, or back-reflection from the switches 112 or antenna elements 104, or some combination thereof. In preferred embodiments the apparatus 100 tracks the local signal in a tracking loop incorporated in a receiver channel 124 and uses it as a baseline pseudorange measurement for differencing against return signals from one or more objects 128. FIG. 5 depicts in schematic form the output of a correlator in a receive channel of a spread spectrum apparatus, showing a correlation peak 544 associated with a local signal and a correlation peak 546 associated with a return signal reflected from an object in the environment, with each correlation peak having a width 548 equal to the duration of two chips in the relevant PRN code as is known in the art of spread spectrum signal processing. A measure related to range to the object can be obtained from the separation 550 between the 'return signal' and 'local signal' correlation peaks 546, 544. Tracking of the local signal, i.e. forming a tracking loop such as a phase-lock loop or delay-lock loop on the local signal, is generally possible even if the local signal is substantially cancelled, since it is known that spread spectrum techniques can readily track weak signals. The multiple rapidly changing reflections expected from objects in the vicinity of a moving autonomous vehicle for example will generally be difficult to track, however as will be seen it is generally unnecessary to track such signals and in preferred embodiments no attempt is made to do so. The local signal on the other hand will be essentially constant and therefore relatively easy to track. Not only will it provide a solid 'baseline' for range measurements, but the differencing procedure between measurements associated with reflections from surrounding objects and the local signal will eliminate many sources of so-called 'common mode' errors in the apparatus. For example it will eliminate errors resulting from drift, caused for example by thermal or voltage variations, in components through which both return and local signals propagate, thereby providing improved range estimates compared to conventional methods for measuring round-trip propagation delays.

Continuous Wave Embodiments

Referring to FIG. 1, in certain embodiments the junction 120 comprises a passive component such as an RF circulator that allows the apparatus 100 to transmit and receive signals simultaneously. The local signal is tracked in a receiver channel 124 and return signals can be processed either in the same channel or in one or more other channels that are 'slaved' off the local signal channel.

Figure 6:
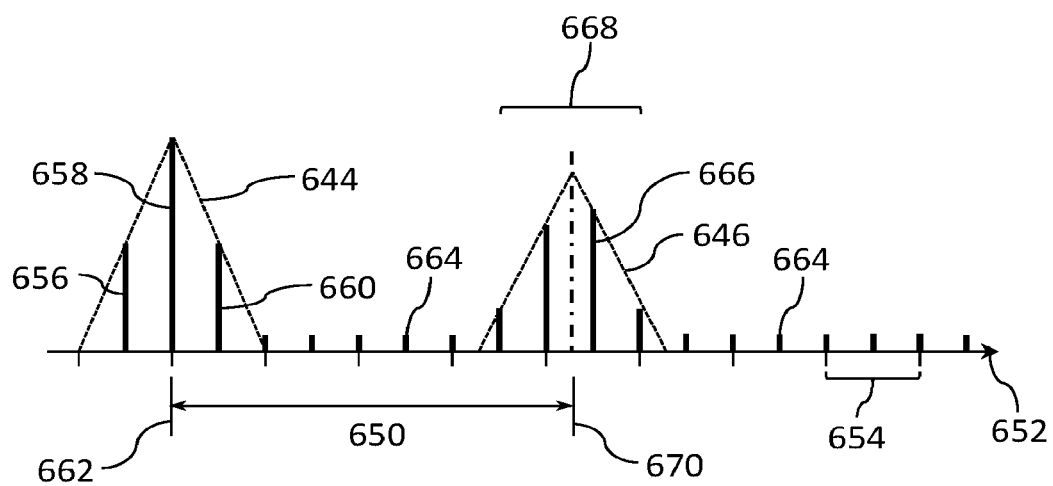
FIG. 6 shows a scheme by which the apparatus of FIG. 1 can detect a local signal and a signal reflected from an object in the environment.

In certain embodiments the local and return signals are processed in the same channel, by providing the local signal tracking channel with a number of additional taps. Each additional tap has one or more correlators in which a received signal is mixed with a carrier reference signal from the common carrier numerically controlled oscillator (NCO) for the channel, and mixed with a delayed copy of the PRN code replica clocked from the common code NCO for the channel. FIG. 6 illustrates in schematic form the correlator outputs from this channel on a time/distance line 652 marked in intervals 654 corresponding to one chip of the PRN code applied to the transmitted signal. If for example the PRN code has 100 ns chip periods, the marked intervals 654 will correspond to round-trip distances of 30 m. The time/distance line 652 shows early, prompt and late correlation values 656, 658 and 660 on a half chip spacing obtained from tracking the local signal. A 'local signal' correlation peak 644 two chips wide can be tracked, centred on the prompt correlation value 658 which for range determination can be regarded as a baseline measurement or 'zero' point 662. Signals received through the sequentially activated antenna elements are mixed with the carrier reference signal and incrementally delayed copies of the PRN code replica in a number of additional taps 664 provided, in this example, on a half chip spacing. As discussed above phase or gain manipulations are applied to received signal segments to form a reciprocal beam in a desired direction. If a received signal is a return of the transmitted signal, and a copy of the PRN code replica applied sufficiently close in time to the actual arrival time of the signal, typically within one chip, a non-negligible correlation value will result. In the illustrated example non-negligible correlation values 666 are detected for a group 668 of four taps, with interpolation resulting in a correlation peak 646 with a maximum correlation value at a position 670 approximately 4.3 code chips away from the 'zero' point 662. With 100 ns chips, this separation 650 corresponds to a round-trip delay of 430 ns, equivalent to a round-trip distance of 129 m. The apparatus therefore infers the presence of an object 64.5 m away in the direction corresponding to the currently formed reciprocal beam. Similar processing of received signals can occur in parallel in one or more other channels, with application of different phase or gain manipulations for forming reciprocal beams in other directions for detection of objects in those directions. Reflections from multiple objects at different ranges in the same look direction can in general be detected, subject to limitations of dynamic range and range resolution. Range resolution is generally determined by the bandwidth, or in other words the chipping rate or chip duration, of the PRN code imposed on the signal. For example PRN codes with 100 ns or 20 ns chip durations would provide range resolutions of ~15 m or ~3 m respectively.

The number of taps 664 required can be chosen according to the maximum range of interest. For example 40 taps on a half chip spacing, with 100 ns chips, would allow detection of objects up to 300 m away (600 m round-trip distance). The half chip spacing of taps 664 shown in FIG. 6 is purely arbitrary and can be varied according to requirements. For example a closer spacing will provide greater correlator resolution, and in another example a receive channel has 200 taps on a 1/10 chip spacing which, for 100 ns chips, again enables detection of objects up to 300 m away. Depending on the required accuracy and the tap spacing, a range estimate may be obtained from the position of the tap with the greatest correlation value rather than from interpolation within a group of taps.

Figure 7:
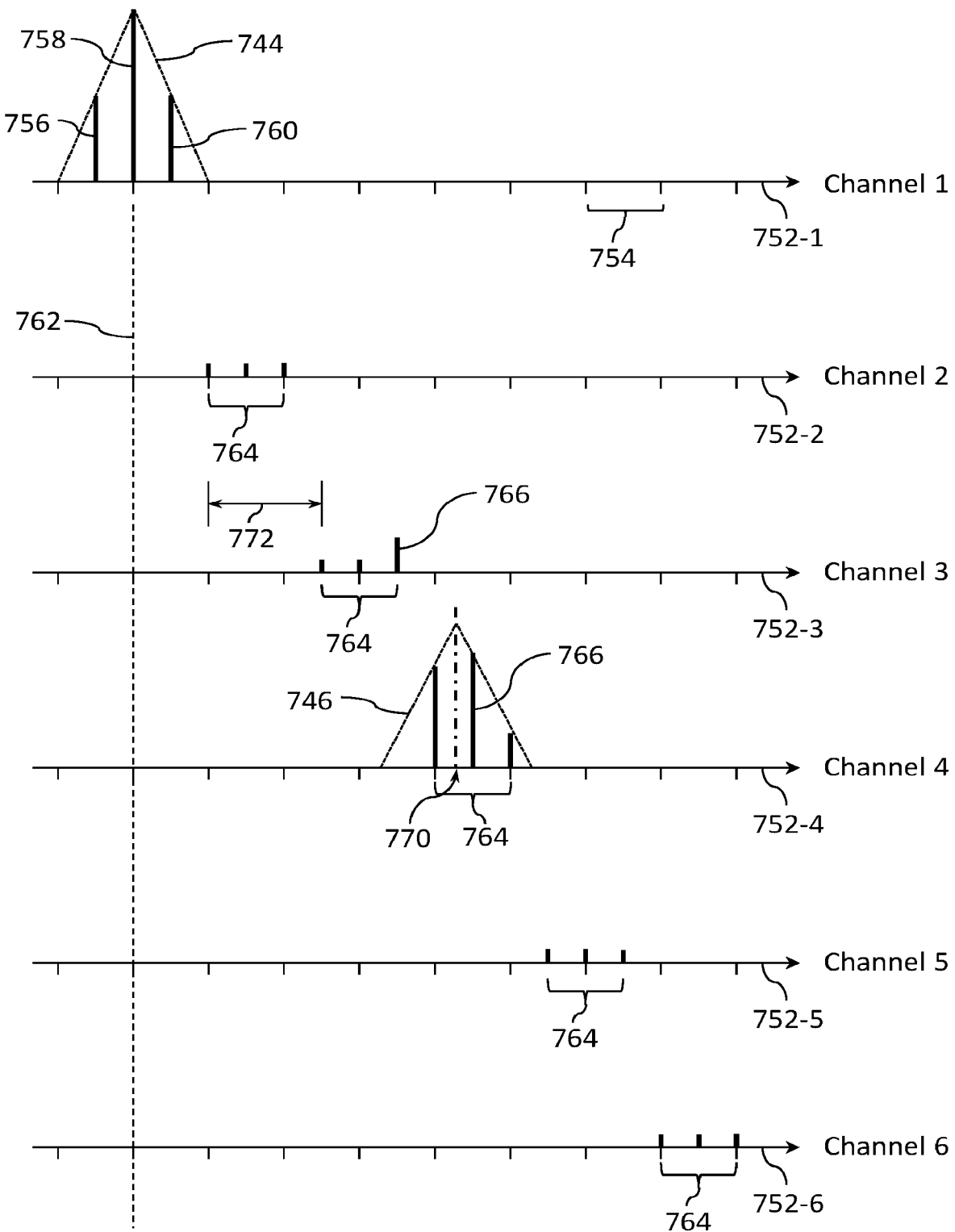
FIG. 7 shows another scheme by which the apparatus of FIG. 1 can detect a local signal and a signal reflected from an object in the environment.

For simplicity, the timing of the phase or gain manipulations for beam forming was not considered in the single channel embodiment shown in FIG. 6. FIG. 7 illustrates a more preferred approach in which one receive channel, labelled Channel 1, is dedicated to tracking the local signal and a number of additional channels with a small number of taps 764 are slaved off Channel 1 for detecting return signals. In each slave channel the same PRN code replica, carrier NCO and code NCO values as in Channel 1 are applied to maintain frequency and phase coherence with Channel 1, with the addition of successive PRN replica code delays in each tap 764. The illustrated example shows five slave channels labelled Channels 2 to 6, each with three taps 764 on a half chip spacing, and with time offsets 772 of 1.5 chips between the groups of taps. Phase or gain manipulations are applied to received signal segments in Channels 2 to 6 to form a reciprocal beam in a desired direction. Generally, there is no need to apply beam forming manipulations to Channel 1 as this channel is dedicated to the local signal which is not received through the antenna elements. Similar processing of received signals can occur in parallel in one or other groups of slave channels, with different phase or gain manipulations for forming reciprocal beams in other directions.

The correlator outputs from Channels 1 to 6 are shown on time/distance lines 752-1, 752-2, 752-3, 752-4, 752-5 and 752-6 marked in intervals 754 corresponding to one chip of the PRN code used to encode the transmitted signals. Similar to the case shown in FIG. 6 a 'local signal' correlation peak 744 computed from early, prompt and late correlation values 756, 758 and 760 in Channel 1 allows determination of a baseline measurement in the form of a 'zero' range point 762, and interpolation of non-negligible correlation values 766 computed in Channels 3 and 4 enables the determination of a correlation peak 746 with a maximum correlation value at a point 770 delayed by approximately 4.3 chips from the zero point 762. With 100 ns chips, this again corresponds to a round-trip distance of 129 m. Collectively, the five slave channels shown in FIG. 7 are able to cover delays of up to around 8 chips, i.e. a round-trip distance of 240 m. The range could be extended by assigning additional slave channels at greater delays, or by increasing the number of taps 764 per slave channel and the time offset 772 between channels.

There is considerable flexibility in the number of slave channels assigned to a given beam direction, and in the number and spacing of taps within each slave channel. For example the five slave channels in FIG. 7 could be replaced by a single slave channel with sixteen taps on a half chip spacing. However an advantage with the more distributed approach shown in FIG. 7 is that it facilitates the application of phase or gain manipulations at the appropriate times for optimal beam forming. As mentioned previously, the pairing of antenna elements through which a signal is transmitted and received, and therefore the phase or gain manipulations that should be applied to received signal segments for optimal beam forming, depends on the range of interest. Since each slave channel is associated with a given group of code delays, i.e. range to an object, different sets of phase or gain manipulations can be applied according to the expected antenna element pairings during an integration period. By way of example and with reference to FIG. 4, we will assume an antenna element activation sequence in which each element 404A, 404B etc is activated for 1 μs. The group of taps 764 in Channel 2 is clustered around a delay of 150 ns, so that ~85% of a return signal would be received through the same element from which it was transmitted, e.g. element 404A, and the remaining ~15% would be received through the subsequent element in the activation sequence, e.g. element 404B. On the other hand the group of taps 764 in Channel 6 is clustered around a delay of 750 ns, so that ~25% of a return signal would be received through the same element from which it was transmitted, and ~75% through the subsequent element. The phase or gain manipulations applied during the integration periods of each slave channel can be determined according to both the antenna element activation sequence and the expected periods of receipt of signals reflected from an object at the corresponding range/delay. For example different phase or gain manipulations can be applied at the appropriate times for element pairs 404A-404A, 404A-404B, 404B-404B, 404B-404C etc. In other words, each integration period is divided into a number of sub-integration periods that are determined by the overlap of the expected periods of receipt of return signals and the activation periods of the antenna elements.

In an alternate embodiment different sets of phase or gain manipulations are applied to individual taps in a channel, rather than to groups of taps 764. This approach could be used in the embodiment shown in FIG. 6, where the taps 664 are all in a single channel rather than distributed among several channels.

Many other groupings of taps and channels are possible apart from the example embodiments shown in FIGS. 6 and 7. For example if information is only required for objects within a certain range window, e.g. 50 to 100 m, multiple channels could be assigned, each having sufficient taps to cover that window but with different sets of phase or gain manipulations applied to form reciprocal beams in multiple directions. In another example the taps in two or more channels could be interleaved, e.g. to provide taps on a quarter chip spacing instead of a half chip spacing, to increase precision in range determination. In yet another example an apparatus could, having inferred the presence of an object in a certain direction, assign additional channels with phase or gain manipulations chosen to form reciprocal beams in slightly different directions, e.g. to monitor the object or refine the direction determination. The ability to assign dynamically a number of channels with variable parameters, e.g. beam direction and the number and spacing of taps, is a significant advantage of the apparatus and methods of the present invention.

In the above-described embodiments where the apparatus 100 is configured to transmit and receive signals simultaneously, the receiver 110 may encounter difficulties in detecting return signals in the presence of the local signal. Depending on the port isolation of the RF circulator or similar device forming the junction 120 and the impedance mismatches at the switches 112 and antenna elements 104, the local signal may only be 20 or 30 dB less intense than the signal being broadcast and could be considerably stronger than a return signal from an object depending on range and reflectivity. In addition, typical PRN code dynamic range is limited in practice to around 20 dB, resulting in a self-induced 'near-far' problem. The local signal can also interfere with detection of objects separated from the apparatus by a round-trip distance corresponding to less than 1.5 chips, i.e. at a range corresponding to less than three quarters of a chip, because of overlap of the respective correlation peaks. For example if the PRN code has 100 ns chip periods the local signal can interfere with detection of objects closer than 22.5 m. Faster chipping rates will reduce the range at which peak overlap begins, with 20 ns chips reducing it to 4.5 m.

To mitigate self-interference from the local signal, the apparatus may be configured to cancel the local signal using one or more of the cancellation techniques known in the art as mentioned previously. For example self-interference cancellation of up to 110 dB has been reported in Bharadia et al, albeit at the cost of additional hardware. Ideally, the local signal should be cancelled to an extent such that its received power is weaker than received powers associated with reflections, while still remaining strong enough for robust local tracking.

Pulsed Embodiments

In preferred embodiments self-interference from the local signal is mitigated by operating the apparatus in a pulsed mode with interleaved 'transmit' and 'receive' periods or windows in which signals are transmitted and received sequentially through the antenna array 102. In these embodiments the junction 120 may for example comprise an RF switch that selectively connects either the transmitter 108 or the receiver 110 to the antenna array. During transmit windows the receiver 110 accumulates the local signal, while during receive windows the receiver accumulates incoming signals looking for returns from objects 128 in one or more directions determined by the phase or gain manipulations being applied to the received signal segments.

Interference from the local signal is greatly reduced by not accumulating incoming signals during transmit windows. Ideally, the transmitter 108 is completely switched off during the receive windows. In practice, however, while the digital electronics of the PRN code generator can generally be switched on and off at high speeds e.g. 10 ns or faster without difficulty, less agile transmitter components such as the power amplifier may need to remain on continuously, representing a source of low-level noise during receive windows. This source of noise can be ameliorated with careful circuit design and manufacture. Preferably the receiver 110 includes some form of manual gain control that enables the gain of the received input to be adjusted rapidly between receive and transmit windows. The transmit and receive window durations can be chosen according to range requirements and are preferably alternated no faster than the chipping rate of the PRN code, with pulsing sequences varied to ameliorate blind spots as explained below. It should be stressed that the antenna element activation sequence is independent of the transmit/receive pulsing sequence, so the receiver 110 is still able to form reciprocal beams 126.

During transmit windows the receiver tracks and accumulates the local signal in a channel to provide a correlation peak 744 that serves as a baseline measurement or zero point 762 for range determination, as depicted in FIG. 7. The pulsing of the transmitter has little effect on tracking of the local signal, other than to reduce the received correlation power due to the reduced code duty cycle, with the local signal tracking channel correlating on alternate chips or groups of chips in the PRN code. As before, for detection of return signals the receiver assigns, in one or more other channels, a number of additional taps 764 at suitable spacings and code delays to the required maximum range from the zero point 762. The additional taps 764 detect returns from objects in similar fashion to the local signal tracking channel, by correlating on alternate chips or groups of chips in the PRN encoded return signal.

Because incoming signals are only accumulated during receive windows, for any given sequence of transmit and receive windows there is a range-dependent effect on the ability to detect objects. For example a pulsing scheme with transmit and receive windows each 100 ns in duration is optimal for detecting objects at ranges of 15, 45, 75 m etc (corresponding to round trip delays of 100, 300, 500 ns etc) because any return signals that may be present will be detected throughout the receive windows. The overlap between return signals and receive windows decreases either side of these optimal ranges, becoming zero for returns from objects at ranges of 30, 60, 90 m etc, resulting in blind spots around these ranges. This effect can be ameliorated by changing the pulsing scheme to move the blind spots. For example with 200 ns transmit and receive windows the optimal ranges will be 30, 90, 150 m etc and the blind spots will be around 60, 120, 180 m etc. A pulsing scheme with 100 ns transmit windows and 200 ns receive windows will have blind spots around 45, 90, 135 m etc. Generally speaking the blind spots are sparser if the receive windows are longer than the transmit windows, but the overall transmitted power and therefore the ability to detect faint reflections will be reduced by the lower duty cycle. There are clearly many possibilities for varying the pulsing scheme, for example in a pseudorandom pattern.

In preferred embodiments the apparatus 100 is also configured to receive and process positioning signals from a positioning network to determine position-velocity-time (PVT) solutions as an additional functionality. The positioning signals may for example be provided by a network of so-called 'positioning-unit devices' as described in U.S. Pat. No. 7,616,682 (Small). The dual functionality can be enabled conveniently on a time division basis. For example the processor 106 may be programmed to have ten 100 µs time slots in a 1 ms sequence, with nine slots devoted to position determination and one to characterisation of the environment. Different time-sharing schemes are of course possible if more or less frequent environment 'snapshots' are required. For example in some situations it may suffice to characterise the environment of a user platform no more often than once every 100 ms, i.e. an update rate of 10 Hz or less.

Passive Embodiments

Certain other aspects of the present invention concern apparatus and methods in which an apparatus utilises signals from one or more external transmitters to characterise an environment. In broad terms, the apparatus and methods to be described in these aspects utilise similar beam forming techniques to those described in U.S. Pat. Nos. 8,934,844 and 9,640,865. However instead of or in addition to forming beams pointing towards a transmitter or a receiver to mitigate multipath, beams are formed in other directions to look for reflections from objects in the environment. In short, multipath is being utilised rather than mitigated.

Passive Embodiments with Local Beam Forming

Figure 8:
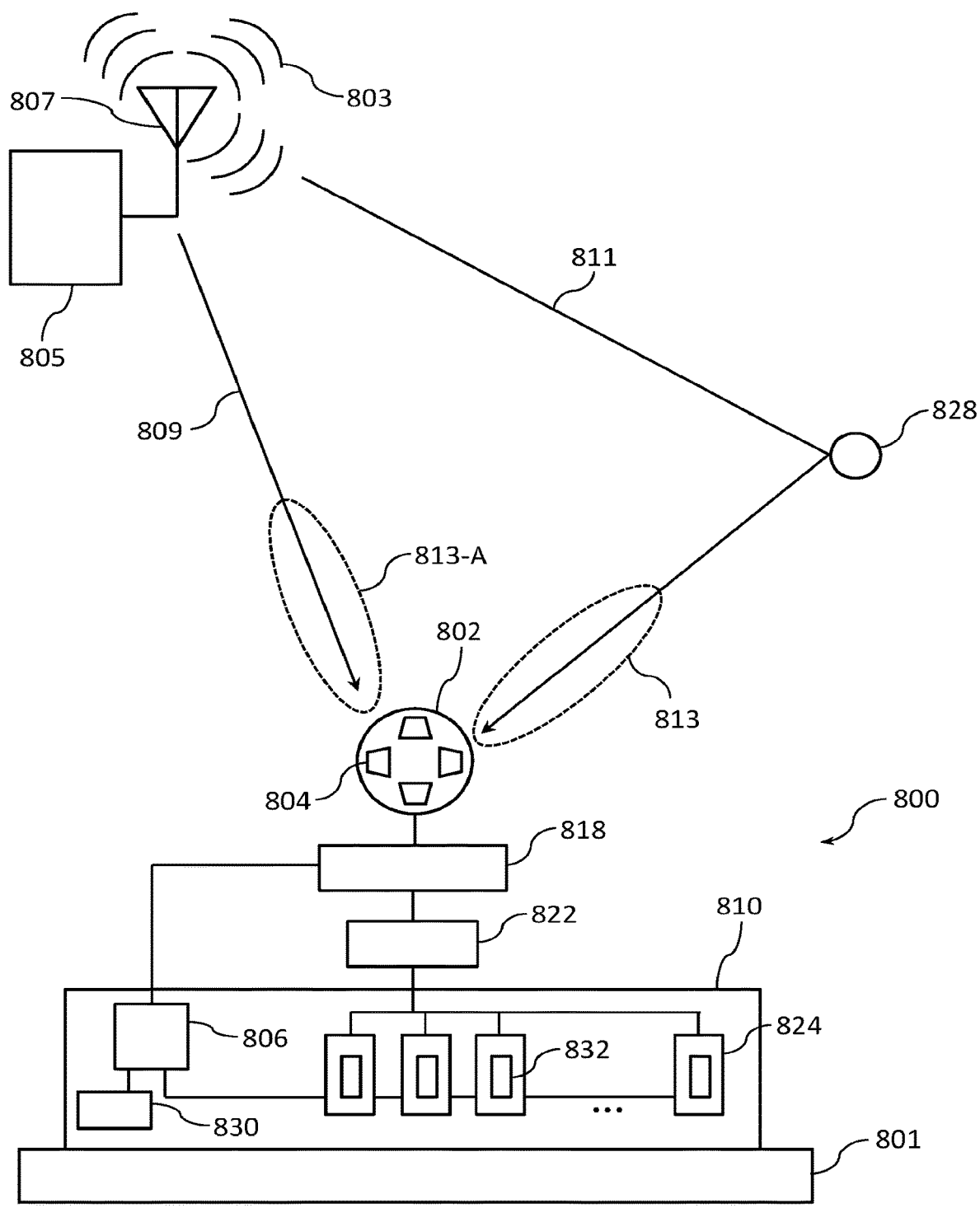
FIG. 8 shows a block diagram of an apparatus utilising signals from an external transmitter to characterise the environment of an associated user platform, according to an embodiment of the invention.

FIG. 8 depicts in schematic form an apparatus 800 for characterising the environment of an associated user platform 801, according to an embodiment of the present invention. The apparatus comprises a receiver 810 and an antenna array 802 in the form of a spherical array having a plurality of spatially distributed antenna elements 804 for receiving spread spectrum signals 803 from an external transmitter 805. The external transmitter 805 is equipped with a conventional fixed antenna 807 such as an omnidirectional antenna. A processor 806 operatively associated with the receiver 810 activates the antenna elements 804 in a predetermined sequence via a switching network 818. RF signals received through the sequentially activated antenna elements 804, e.g. via a direct path 809 or an indirect path 811, are downconverted in an RF front end 822 for processing in one or more receive channels 824.

To enhance the gain of the antenna array 802 in one or more directions, i.e. to form 'receive' beams 813 or 813-A pointing in one or more directions, the receiver 810 is configured to apply, in one or more correlators 832 of one or more channels 824 and in substantial synchronisation with the predetermined antenna element activation sequence, one or more sets of phase or gain manipulations to incoming signal segments received through the sequentially activated antenna elements 804. The manipulated signal segments are then accumulated in one or more registers, known as accumulators, in one or more channels 824 over an integration period to form the required receive beam(s). The apparatus 800 infers the presence of an object 828 in a certain direction based on the detection in the relevant beam 813 of a reflected signal from the transmitter 805. The integration period generally corresponds to one or more complete cycles of the predetermined antenna element activation sequence. Unlike in the case of 'reciprocal' beams discussed with reference to FIGS. 1 to 4 where RF energy is transmitted and received through the same antenna array, in this case the antenna array 802 is only being used to receive RF energy. Consequently the phase or gain manipulations to be applied to form a beam 813 or 813-A in a given direction only need to be determined for incoming signals. The required phase or gain manipulations may be calculated by a processor 806 in real time or retrieved from a database 830.

Figure 9:
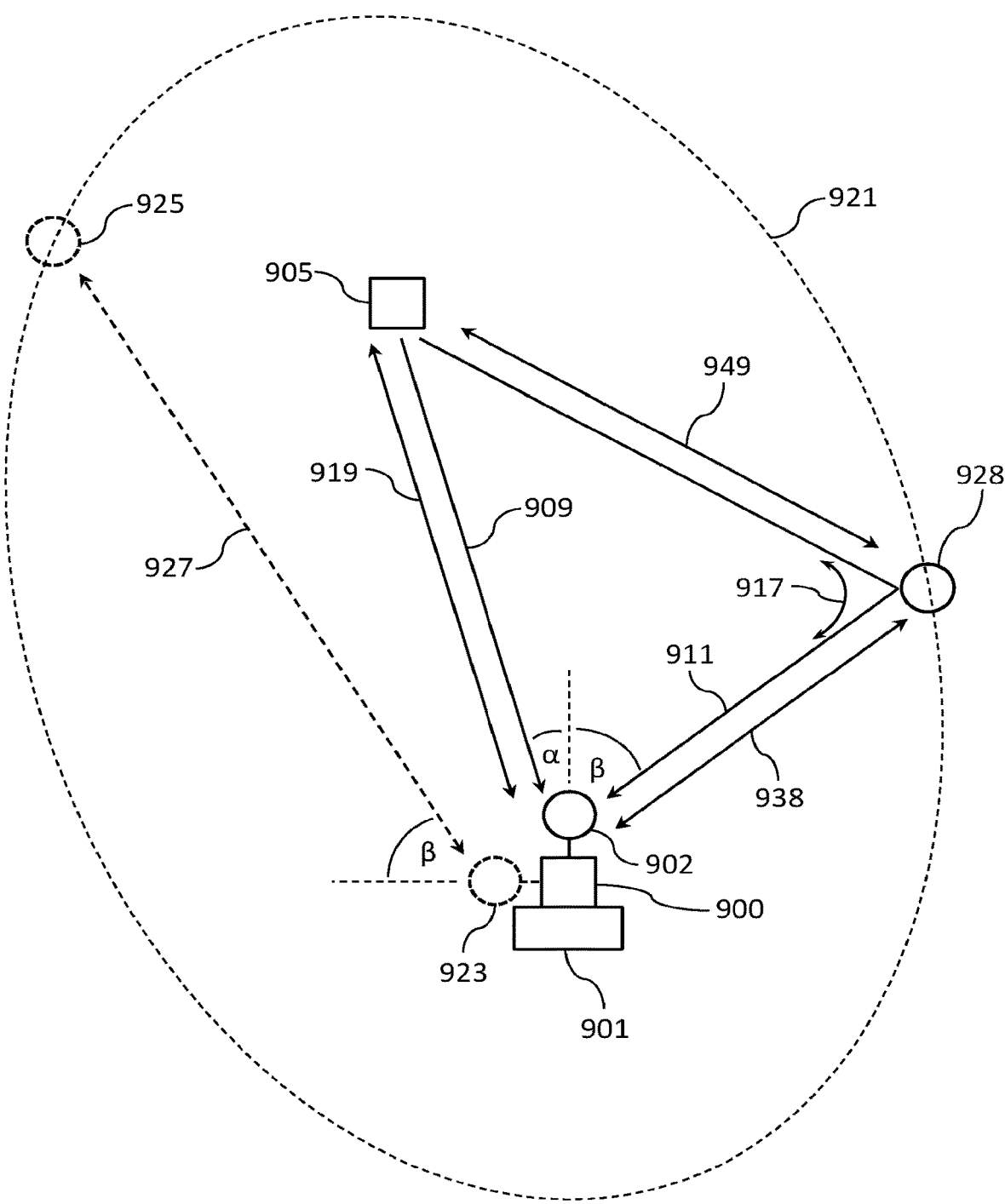
FIG. 9 illustrates the geometry of the apparatus shown in FIG. 8.

For describing how an apparatus 800 can characterise the environment of an associated user platform 801 using signals from one or more external transmitters 805, the geometry of the system is shown in FIG. 9. For obtaining one or more measures related to range to an inferred object an apparatus 900 generally requires knowledge of the position of an external transmitter 905, its own position and the orientation a of its antenna array 902 with respect to the external transmitter. It is generally straightforward for the apparatus 900 to determine the position of the transmitter 905, e.g. from *A. priori* knowledge or from information encoded in the transmitted signals. There are several means by which the apparatus 900 can determine its position and the orientation a of its antenna array 902. For example if the associated user platform 901 is static the apparatus may know this information a *priori*. In preferred embodiments the transmitter 905 is one of several such transmitters in known positions forming a terrestrial positioning network that enables the apparatus 900 to calculate PVT solutions. Furthermore if the apparatus has been forming beams to track the transmitters, such as the direct path beam 813-A shown in FIG. 8, it will also know the orientation a of its antenna array 902 with respect to a given transmitter 905. In yet another example the apparatus 900 may determine its position by other means, e.g. from GPS signals, and the orientation a of its antenna array 902 by forming a direct path beam 813-A. The apparatus is generally able to form a direct path beam to a given transmitter 905 by conducting a beam space search to determine the signal direction associated with the shortest pseudorange. Although a pseudorange can only be converted to an actual range if the clock of the receiver is aligned with, or at least at a known offset from, the clock of the transmitter 905, e.g. as a result of a PVT solution, the beam with the shortest pseudorange will, in the absence of occlusion, correspond to the direct path.

To characterise the environment of an associated user platform 901 the apparatus 900 performs a beam space search looking for PRN-encoded signals from an external transmitter 905, e.g. by forming and sweeping a small number of beams or by forming simultaneously a sufficient number of beams to monitor an entire area of interest without sweeping, to determine directions in which PRN-encoded signals from the transmitter 905 are received. As shown in FIG. 9 the apparatus 900 finds a non-negligible or above threshold signal 911 from a direction with bearing β, presumably arriving via reflection of a transmitted signal 803 from an object 928 at an as yet unknown range 938. If the apparatus 900 can measure the path length 917 for this indirect path signal 911 it can use that information, together with the range 919 to the transmitter 905 and the orientation a of its antenna array 902, to determine the so-called bistatic range ellipse 921. The apparatus 900 can typically determine the range 919 to the transmitter from knowledge of its position and the transmitter position. The intersection of the bearing β with the ellipse 921 then allows the apparatus to estimate the range 938 to the object 928. Knowledge of the orientation of the antenna array 902 with respect to the transmitter 905, i.e. the angle α, is vital in the range estimation. If for example the antenna array 902 were oriented 90 degrees anticlockwise as shown in dotted outline 923, the intersection 925 of the bearing β with the bistatic range ellipse 921 would indicate a significantly different range 927.

For completeness we note that the analysis will also provide the range 949 from the external transmitter 905 to the object 928, which may be of interest in some circumstances.

Various methods for measuring the indirect signal path length 917 will now be discussed. If the indirect path signal 911 is sufficiently stable for the receiver to acquire and track it in a dedicated tracking channel, which may be the case for example if both the user platform 901 and an object 928 are stationary or sufficiently slow moving, the receiver will be able to perform a pseudorange measurement for the indirect path signal 911. If the offset between the clocks of the receiver and the external transmitter 905 is known, e.g. by virtue of a previously calculated PVT solution, the measured pseudorange will, after correction for the clock offset, correspond to the actual indirect signal path length 917. On the other hand if the clock offset is unknown, the receiver can eliminate the clock offset by differencing the pseudoranges measured for the indirect and direct path signals 911, 909 to obtain an accurate measurement for the path length difference.

Figure 10:
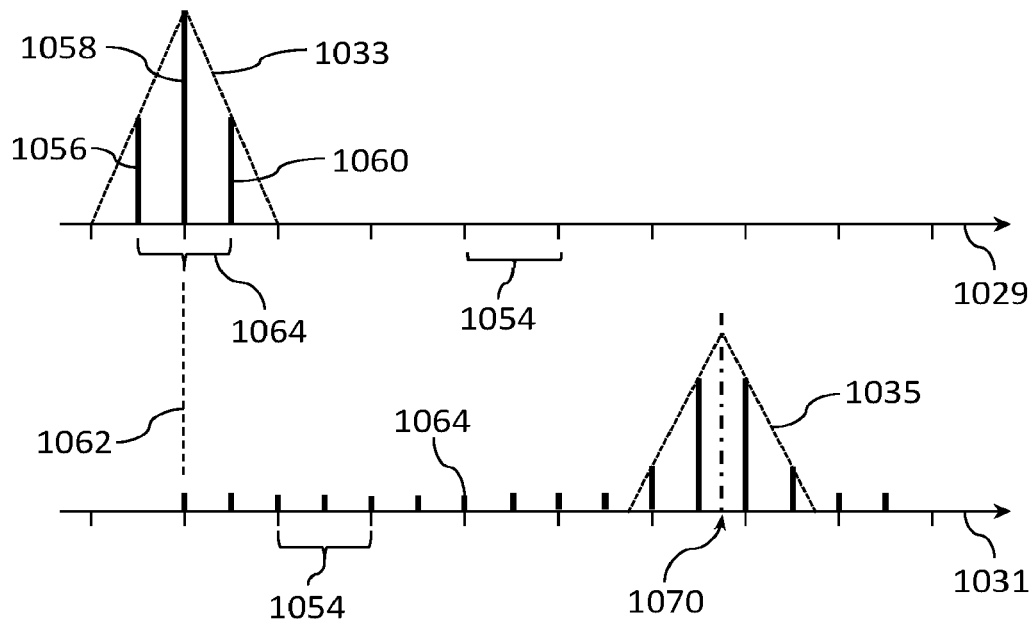
FIG. 10 shows a scheme by which the apparatus of FIG. 8 can detect a direct path signal and a signal reflected from an object in the environment.

In preferred embodiments the receiver makes no attempt to track the indirect path signal 911 with a tracking loop. Instead, it tracks the direct path signal 909 in a tracking loop within a first channel and detects indirect path signals using a series of taps at incremental PRN code delays in one or more slave channels, similar to the situation described above with reference to FIG. 7. In one particular example shown in FIG. 10, the receiver dedicates a first channel 1029 to the direct path signal 909 and a second, slave channel 1031 to an indirect path signal 911, with each channel represented by a time-distance line marked in one chip intervals 1054. In each channel a received signal is mixed with a suitably phase or gain-modified carrier reference signal to form an appropriate beam 813-A or 813, and mixed with a plurality of appropriately delayed of the PRN code replica. In the embodiment shown in FIG. 10 the first channel 1029 has a group of three taps 1064 on a half chip spacing for determining a 'direct path signal' correlation peak 1033 based on early, prompt and late correlation values 1056, 1058 and 1060. The determined position 1062 of this peak provides a time of arrival for the direct path signal 909, analogous to the 'zero point' measurement provided by the local signal in the 'reciprocal beam' aspect. The slave channel 1031 has a series of taps 1064 on a half chip spacing, in which the suitably modified carrier reference signal and incrementally delayed copies of the PRN code replica are mixed with received signals. In this particular example significant correlation values are measured for a group of four taps, with straightforward interpolation resulting in an 'indirect path signal' correlation peak 1035 with a maximum correlation value at a position 1070 approximately 5.75 code chips away from the position 1062 of the 'direct path signal' peak 1033. This determines the difference between the arrival times of the indirect and direct path signals 911, 909 which, with 100 ns chips, corresponds to a path length difference of 172.5 m between the indirect and direct signals path 911, 909. A measure related to range may alternatively be obtained from the position of the tap with the greatest correlation value rather than from interpolation within a group of taps. The number of taps 1064 and their spacing in the slave channel 1031 can be chosen according to the expected maximum path length difference and correlator resolution.

Figure 11:
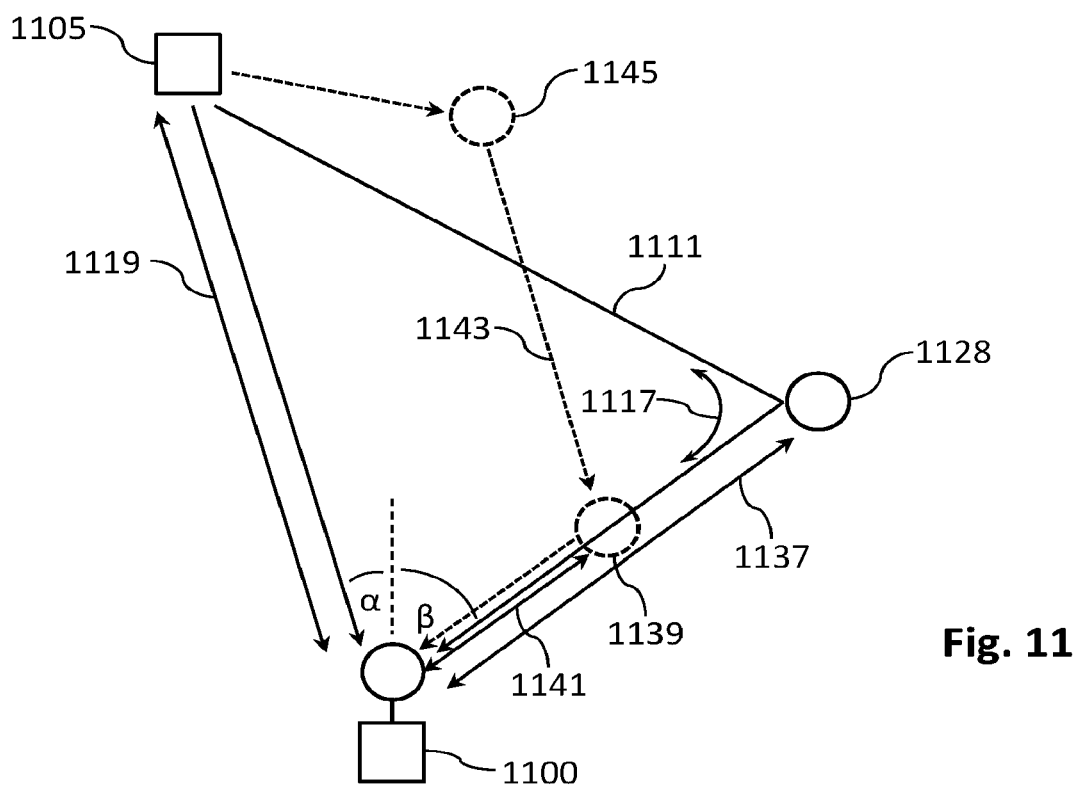
FIG. 11 illustrates the possibility of a double reflection path-related ambiguity for the apparatus shown in FIG. 8.

There remains, however, a possibility of ambiguities arising from multiple reflections. To explain, FIG. 11 again shows the geometry of the FIG. 8 system, this time considering the possibility of a double reflection path. If it is assumed that a signal transmitted from a transmitter 1105 and received by an apparatus 1100 has propagated along a single reflection path 1111, then knowledge of the angles α and β, the transmitter range 1119 and the indirect signal path length 1117, or its difference to the transmitter range, is sufficient to determine the length 1137. The apparatus 1100 will interpret this length as an estimate of range to an inferred object 1128. However an object could for example be at position 1139 with a smaller range 1141 if the signal has travelled along a double reflection path 1143 of equal length to the single reflection path 1111, via a second object 1145. Generally, the likelihood of the apparatus correctly determining object range will be improved if it utilises signals from additional transmitters to cross-check candidate positions. The receiver of the apparatus 1100 will of course be able to distinguish signals from different transmitters because of the different PRN codes. The formation of additional beams to look for signals reflected from objects in other directions will also assist in improving the accuracy of range estimations.

Passive Embodiments with Remote Beam Forming

Figure 12:
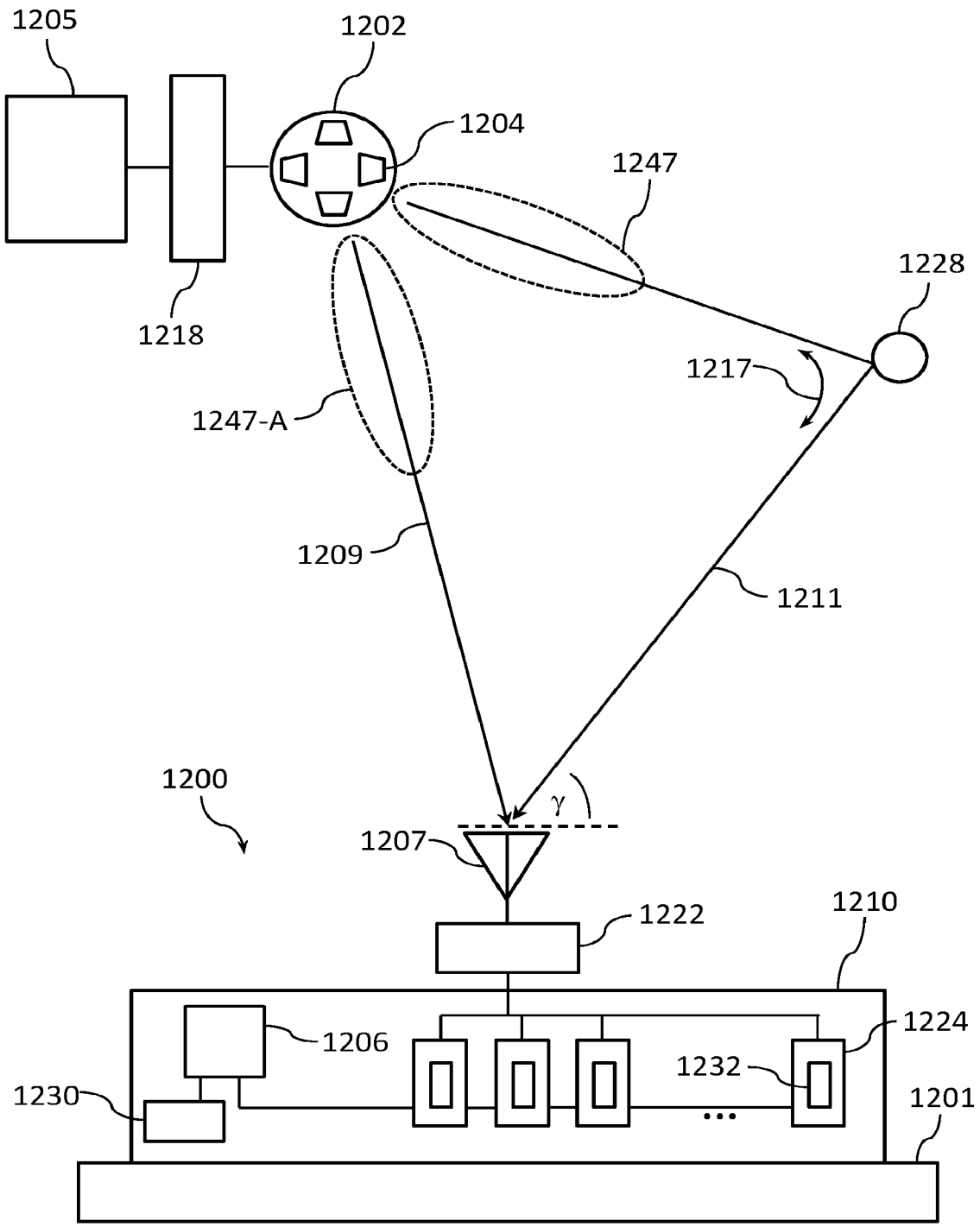
FIG. 12 shows a block diagram of an apparatus utilising signals from an external transmitter to characterise the environment of an associated user platform, according to another embodiment of the invention.

FIG. 12 depicts in schematic form an apparatus 1200 for characterising the environment of a user platform 1201 according to another embodiment of the present invention. In the illustrated embodiment the apparatus comprises a receiver 1210 for receiving spread spectrum signals from an external transmitter 1205 equipped with a spherical antenna array 1202 having a plurality of spatially distributed antenna elements 1204. The apparatus 1200 need only be equipped with a conventional fixed antenna 1207 such as an omnidirectional antenna. RF signals from the external transmitter 1205 are broadcast through antenna elements 1204 activated via a switching network 1218 in a predetermined sequence known to the receiver 1210 either *A. priori* or from relevant information encoded in the signals. Received incoming signals, including signals received from the transmitter 1205 via a direct path 1209 or an indirect path 1211, are downconverted in an RF front end 1222. One or more sets of phase or gain manipulations are then applied to received signal segments in one or more correlators 1232 of one or more channels 1224, and the manipulated signal segments accumulated over an integration period that generally corresponds to one or more complete cycles of the predetermined sequence. Provided the phase or gain manipulations are applied in substantial synchronisation with the receipt of signals from the sequentially activated antenna elements 1204, as explained in U.S. Pat. No. 9,640,865, the result will be one or more 'transmit' beams 1247 or 1247-A pointing in desired directions from the antenna array 1202. The required phase or gain manipulations may be calculated by a processor 1206 in real time or retrieved from a database 1230. To form beams correctly the receiver 1210 needs to know the activation sequence of the transmit antenna elements 1204, the PRN code applied by the transmitter 1205 to transmitted signals and the synchronisation of the PRN code with the activation sequence, as well as the orientation and configuration of the antenna array 1202.

Figure 13:
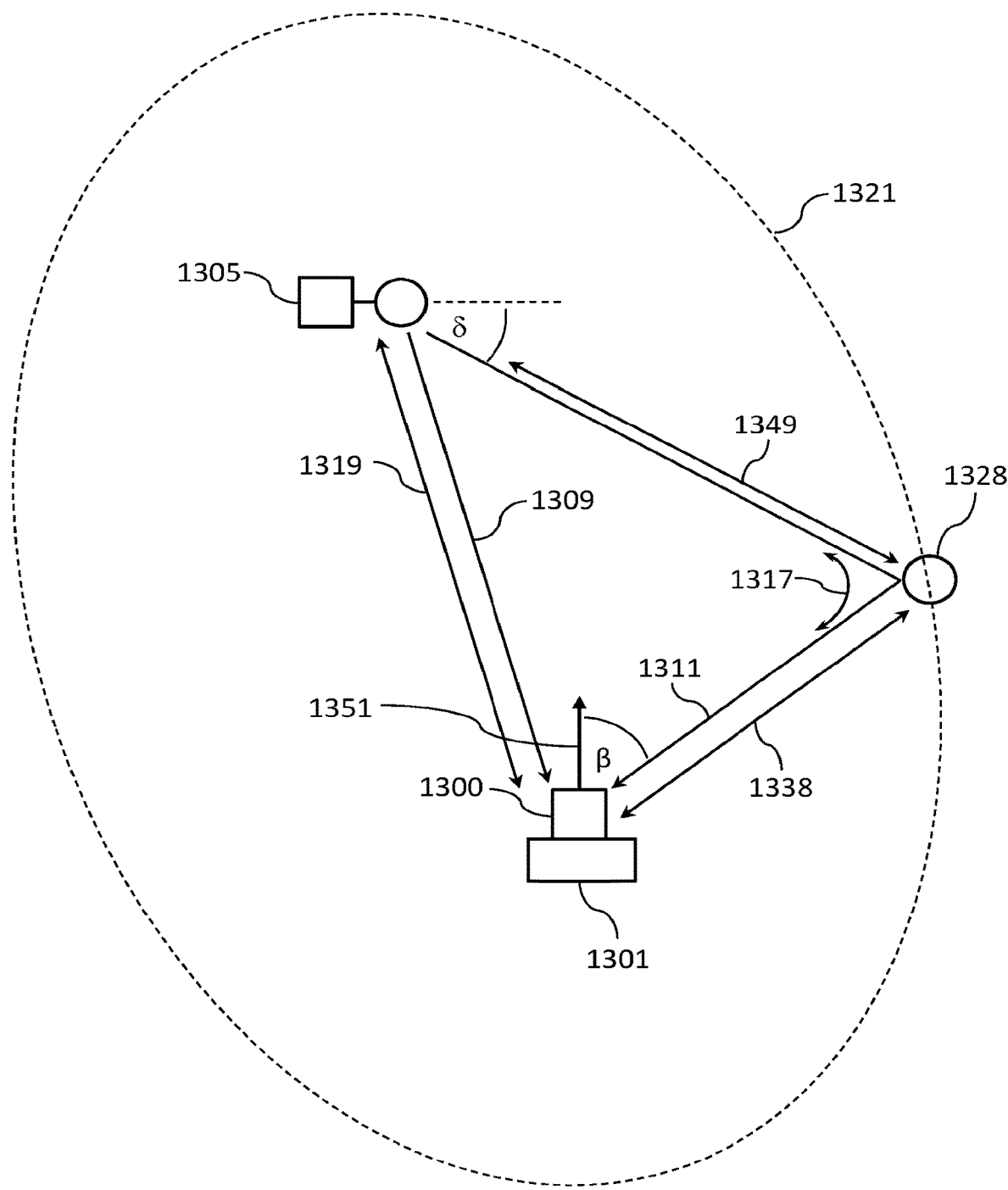
FIG. 13 illustrates the geometry of the apparatus shown in FIG. 12.

In certain embodiments the apparatus 1200 characterises the environment of an associated user platform 1201 using signals from the external transmitter 1205 by forming 'transmit' beams 1247 pointing in various directions from the antenna array 1202 and inferring the presence of objects 1228 in those directions based on the detection of reflected signals transmitted from the activated antenna elements 1204. Referring to the geometry of the FIG. 12 system as shown in FIG. 13, the apparatus 1300 performs a beam space search looking for PRN-encoded signals from an external transmitter 1305, e.g. by forming and sweeping a small number of beams 1247 or by forming a sufficient number of beams to monitor an entire area of interest without sweeping. The apparatus 1300 looks for beam directions from the transmitter 1305 that result in signals with the appropriate PRN code being received. As shown in FIG. 13 the apparatus 1300 finds a non-negligible or above threshold signal 1311 associated with a transmitter beam angle δ, presumably arriving via reflection off an object 1328 at an as yet unknown range 1338. If the apparatus 1300 can measure the path length 1317 for this indirect path signal 1311 it can use that information, together with its position and that of the transmitter 1305, or equivalently the range 1319 to the transmitter, to determine the bistatic range ellipse 1321. The intersection of the bearing δ with the ellipse allows the apparatus 1300 to estimate the range 1338 to the inferred object 1328. Alternatively or additionally, the apparatus can estimate the range 1349 from the transmitter 1305 to the inferred object 1328.

It should be noted that if the associated user platform 1301 is stationary and the apparatus 1300 does not know its orientation or 'look direction' 1351 with respect to the transmitter 1305, the apparatus will be unable to orient any 'map' it generates of the environment. For example although the apparatus can estimate the bearing δ and range 1349 from a transmitter 1305 to an inferred object 1328, as well as range 1338 from itself to that object, it will be unable to determine the direction β to that object with respect to its look direction 1351. However as soon as the associated user platform 1301 begins moving the apparatus 1300 will be able to determine its orientation, and therefore the direction β, by monitoring changes in range to the inferred object 1328 or the transmitter 1305.

Returning to FIG. 12, it should be noted that for the receiver 1210 to form the beams 1247 and 1247-A remotely at the array 1202, the appropriate gain and phase manipulations should be applied to received signal segments in substantial synchronisation with the receipt of the signal segments from the activated antenna elements 1204. On the face of it this requires knowledge of the propagation delay for the respective signal paths, because although the receiver 1210 can calculate or look up the required phase or gain offsets for each element 1204 of the array 1202, unless it knows the propagation delay it will not know when to apply these offsets to the received signal. As explained in U.S. Pat. No. 9,640,865 the known alignment or synchronisation of the antenna element activation sequence to the PRN code with which transmitted signals are encoded enables the receiver 1210 to apply the required phase or gain offsets to a received signal with the correct timing, provided that signal can be tracked. This will be the case for the direct path signal 1209, and if the receiver is also able to track the indirect path signal then pseudorange measurements can be used to determine the indirect signal path length 1217 as explained with reference to FIGS. 8 and 9. However as noted previously it will often be difficult to track the indirect path signal 1211.

In preferred embodiments the receiver 1210 makes no attempt to track an indirect path signal 1211 with a tracking loop. Instead, it tracks the direct path signal 1209 in a tracking loop within a first channel and employs a series of taps at incremental delays in one or more slave channels to search for correlation peaks associated with indirect path signals 1211. The process is similar to that of the 'local beam forming' embodiment described with reference to FIG. 10, but adapted to deal with the additional timing requirements for forming indirect path beams 1247 remotely. In one example embodiment, illustrated in FIG. 14, the receiver assigns multiple channels 1431-1, 1431-2, 1431-3 . . . 1431-n for each required indirect path beam 1247, slaved to a direct path channel 1429. Each channel is represented by a time/distance line marked in one-chip intervals 1454, and each slave channel has a series of taps 1464 on a half-chip spacing extending as far as necessary to cover expected path length differences between indirect and direct path signals 1211, 1209. The direct path channel 1429 operates in much the same fashion as the corresponding channel 1029 in FIG. 10, with the direct path signal 1209 being tracked and a correlation peak 1433 determined at a position 1462 indicative of the time of arrival of the direct path signal. Implicit in the correlation of the direct path signal in the channel 1429 is the application of the appropriate phase and gain manipulations to the received signal for forming the direct path beam 1247-A. In each slave channel 1431-1 . . . 1341-n the appropriate phase or gain manipulations for forming a required indirect path beam 1247 are applied to the received signal, but offset in time by increasing amounts with respect to the direct path beam manipulations. In one example the time offset is zero in channel 1431-1, effectively assuming that the propagation delay for the indirect path signal is the same as for the direct path signal, which will be suitable for forming a beam 1247 if an object 1228 is particularly close to the transmitter 1205 or the apparatus 1200, or if the scale of the system is sufficiently small for propagation delays to be negligible compared to the duration of the antenna element activation period(s). The time offset is incremented in subsequent channels 1431-2 . . . 1431-n by some fraction f of the antenna element activation period T, assuming the antenna elements are activated for equal periods. That is, the time offset is incremented by f·T, with f chosen according to the sensitivity of the beam quality to the synchronisation. By way of example only, f may be 0.05, 0.1, 0.15 or 0.2. An antenna array of eighty antenna elements activated for equal periods in a 100 μs sequence would have T=1.25 μs, in which case the f·T increments may for example be 62.5 ns, 125 ns, 187.5 ns or 250 ns.

Figure 14:
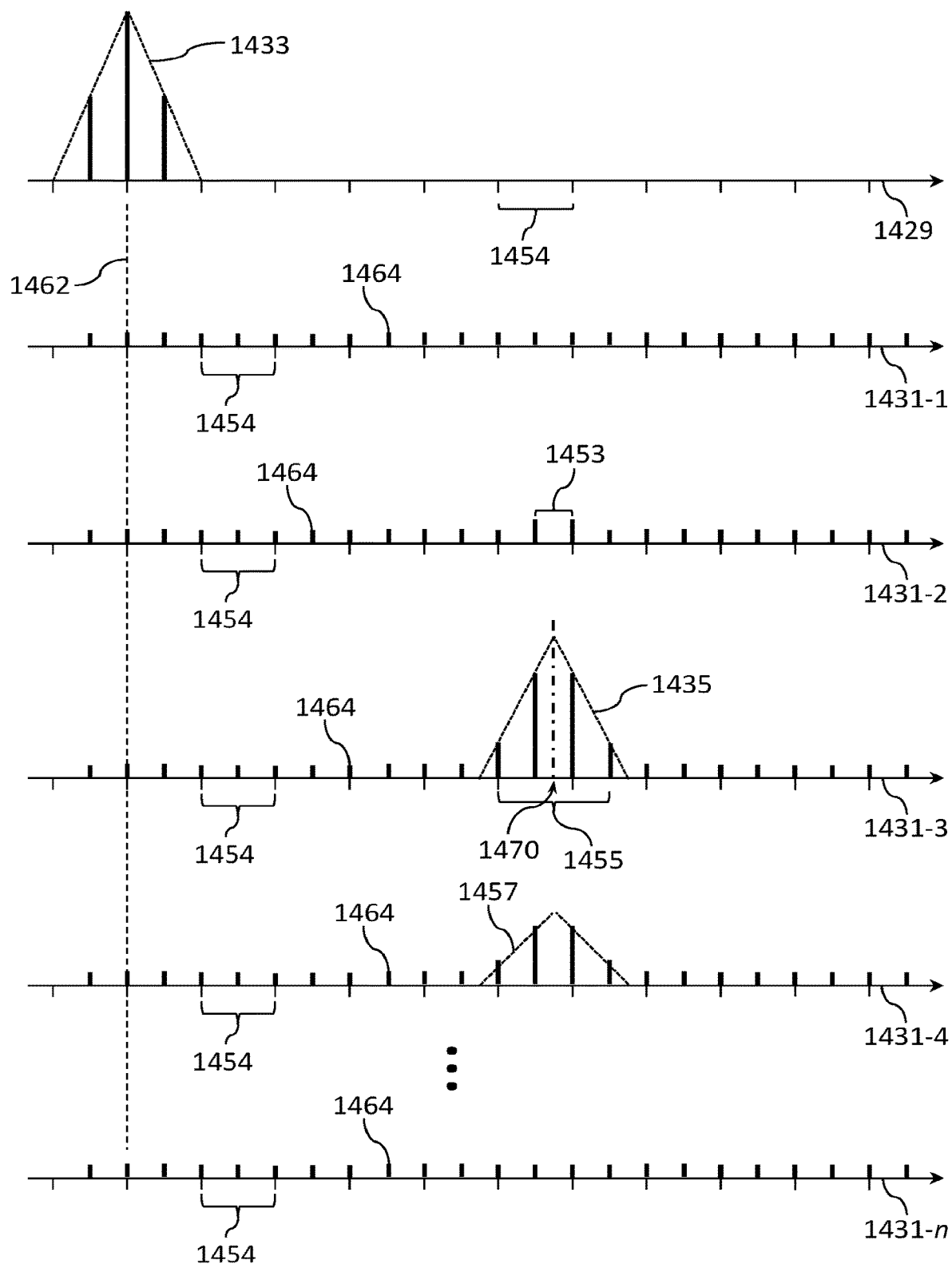
FIG. 14 shows a scheme by which the apparatus of FIG. 12 can detect a direct path signal and a signal reflected from an object in the environment.

In the example shown in FIG. 14, the time offset is zero in channel 1431-1 then incremented by 250 ns in each subsequent slave channel. The measurement of two non-negligible correlation values at a pair of adjacent taps 1453 in channel 1431-2 suggests the trace of a signal, while a clear correlation peak 1435 at a position 1470 can be fitted around a group of taps 1455 in channel 1431-3. A weaker correlation peak 1457 can be fitted in channel 1431-4. This outcome indicates that, among all of the slave channels, the 500 ns time offset with which the phase or gain manipulations are applied in channel 1431-3 resulted in the formation of a beam 1247 of best quality for receiving the indirect path signal 1211. This is consistent with the separation between the correlation peaks 1435 and 1433, indicative of the arrival time of the indirect path signal 1211 relative to the arrival time of the direct path signal 1209, being about 5.75 code chips or 575 ns. This corresponds to a path length difference of 172.5 m between the indirect and direct path signals. The 500 ns time offset imposed on the phase or gain manipulations in channel 1431-3 is sufficiently close to the actual 575 ns propagation time difference between the indirect and direct path signals for the 'substantial synchronisation' requirement to be satisfied, resulting in the formation of an adequate beam 1247.

Figure 15:
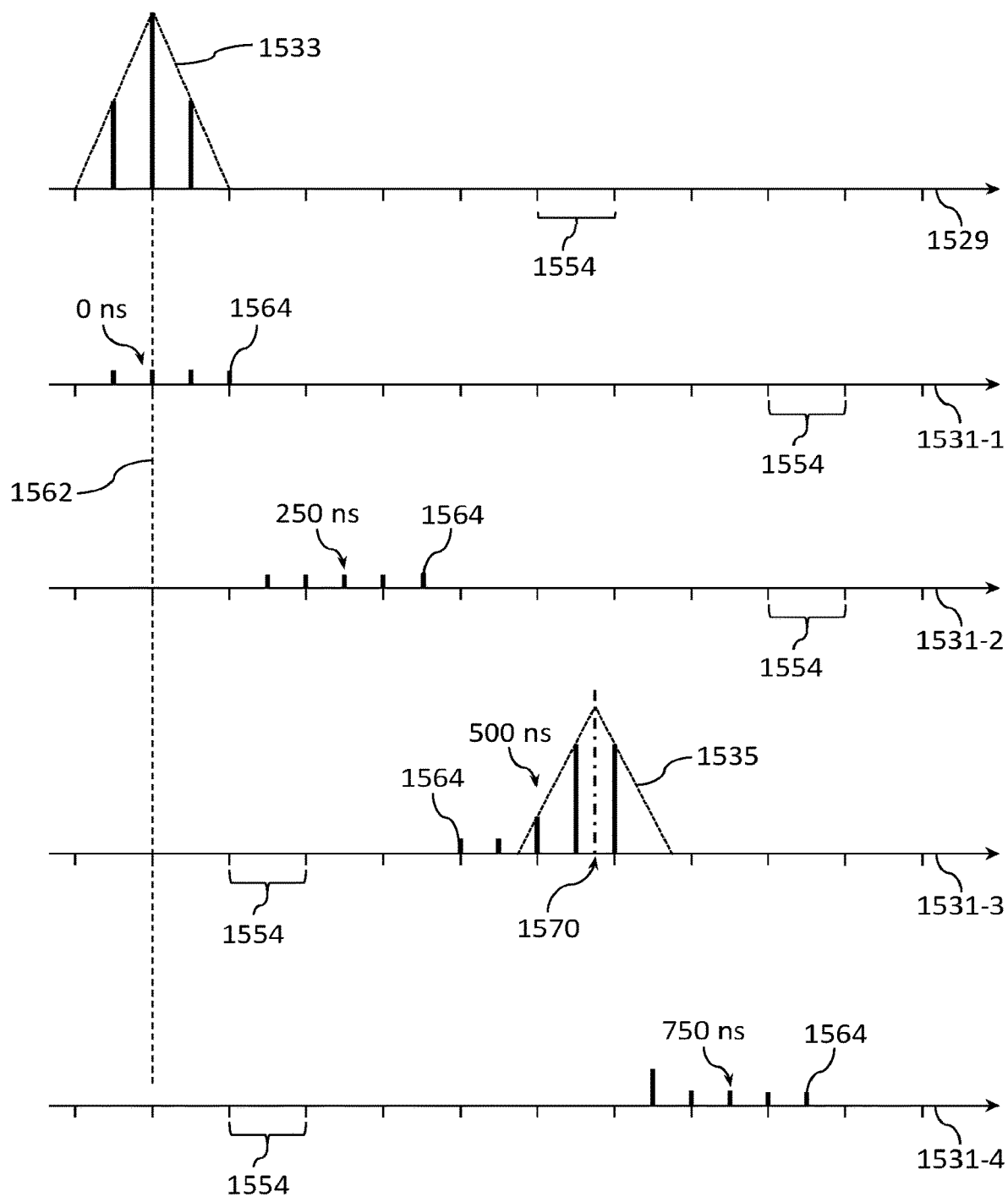
FIG. 15 shows another scheme by which the apparatus of FIG. 12 can detect a direct path signal and a signal reflected from an object in the environment.

This observation suggests that the example embodiment shown in FIG. 14, in which all of the slave channels 1431-1, 1431-2 . . . 1431-n have a large number of taps, is inefficient in its use of receiver resources. FIG. 15 shows a more preferred embodiment that achieves the same result with far fewer taps. As before, each channel is represented by a timeline marked in one-chip (e.g. 100 ns) intervals 1554, with a first channel 1529 tracking the direct path signal 1209 with early, prompt and late taps to obtain a correlation peak 1533 centred at position 1562.

Appropriate phase or gain manipulations for forming a required indirect path beam 1247 are applied to received signal segments in each of the slave channels 1531-1, 1531-2, 1531-3 and 1531-4, offset in time with respect to the 'direct path' beam manipulations by 0 ns, 250 ns, 500 ns and 750 ns for example. This time, however, each slave channel only has a small number of taps 1564 on a half-chip (e.g. 50 ns) spacing, distributed around positions with the same sequence of time offsets, i.e. 0 ns, 250 ns, 500 ns and 750 ns, with respect to the 'direct path' position 1562. Significant correlation values measured for a subset of taps in channels 1531-3 and 1531-4 enable fitting of a correlation peak 1535 with a maximum correlation value at a position 1570 about 575 ns later than the position 1562 of the 'direct path' correlation peak 1533, the same result as was obtained in FIG. 14. In either case the receiver can optionally use the measured propagation time difference to adjust the timing of the phase or gain manipulations to refine the beam quality.

It should be noted that the approach illustrated in FIGS. 14 and 15, with multiple slave channels assigned to an indirect path beam 1247, will not be necessary if the scale of the system is such that the expected propagation time differences between indirect and direct path signals 1211, 1209 are much smaller than the antenna element activation period T. For example if T is of order 10 μs and the propagation time differences are expected to be no more than 100 ns or 1% of T, corresponding to a path length difference of 30 m, there will be negligible degradation in quality of an indirect path beam 1247 if the appropriate phase or gain manipulations are applied with the same timing as those required to form the direct path beam 1247-A. In other words the 'substantial synchronisation' requirement will be satisfied without any additional time offsets, and in this case it would generally suffice to assign only one slave channel per indirect path beam direction, similar to the case shown in FIG. 10.

Figure 16:
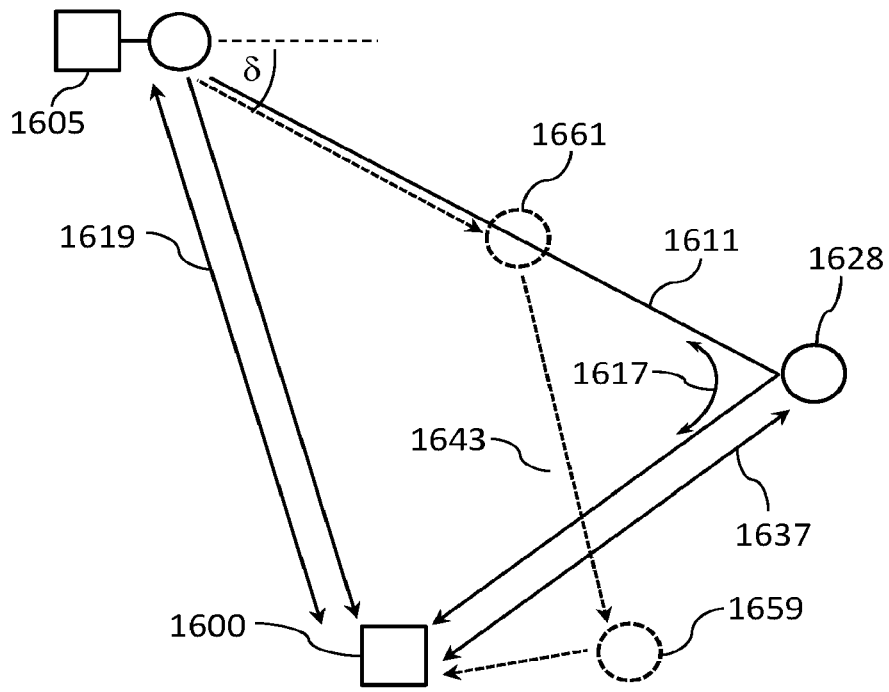
FIG. 16 illustrates the possibility of a double reflection path-related ambiguity for the apparatus shown in FIG. 12.

Again, ambiguities may arise from multiple reflections. To explain, FIG. 16 shows the geometry of the FIG. 12 system, this time considering the possibility of a double reflection path. If it is assumed that a signal received by an apparatus 1600 has propagated via a single reflection path 1611, then knowledge of the angle δ, the transmitter range 1619 and the indirect signal path length 1617, or its difference to the transmitter range, is sufficient to determine the length 1637. The apparatus 1601 will interpret this length as an estimate of range to an object 1628. However a signal could have travelled along a double reflection path 1643 of equal length to the single reflection path 1611, via two objects 1661 and 1659 at different ranges and directions. As before, the likelihood of range estimates being accurate can be increased by cross-checking candidate positions determined from transmit beams 1247 formed in other directions, using signals from the same transmitter 1605 or other transmitters.

The method described above with reference to FIG. 12 advantageously enables an apparatus 1200 to characterise the environment of an associated a user platform 1201 without requiring a multi-element antenna array, enabling miniaturisation to a hand-held device which would be particularly useful for example if the user platform is a person rather than a vehicle. The necessary beams 1247, 1247-A are formed at the antenna array 1202 associated with the external transmitter 1205. Furthermore because phase or gain manipulations for forming the beams are applied in the receiver 1210, the system is multi-access meaning that any number of user platforms 1201 can utilise the same signals.

Passive Embodiments with Composite Beam Forming

Figure 17:
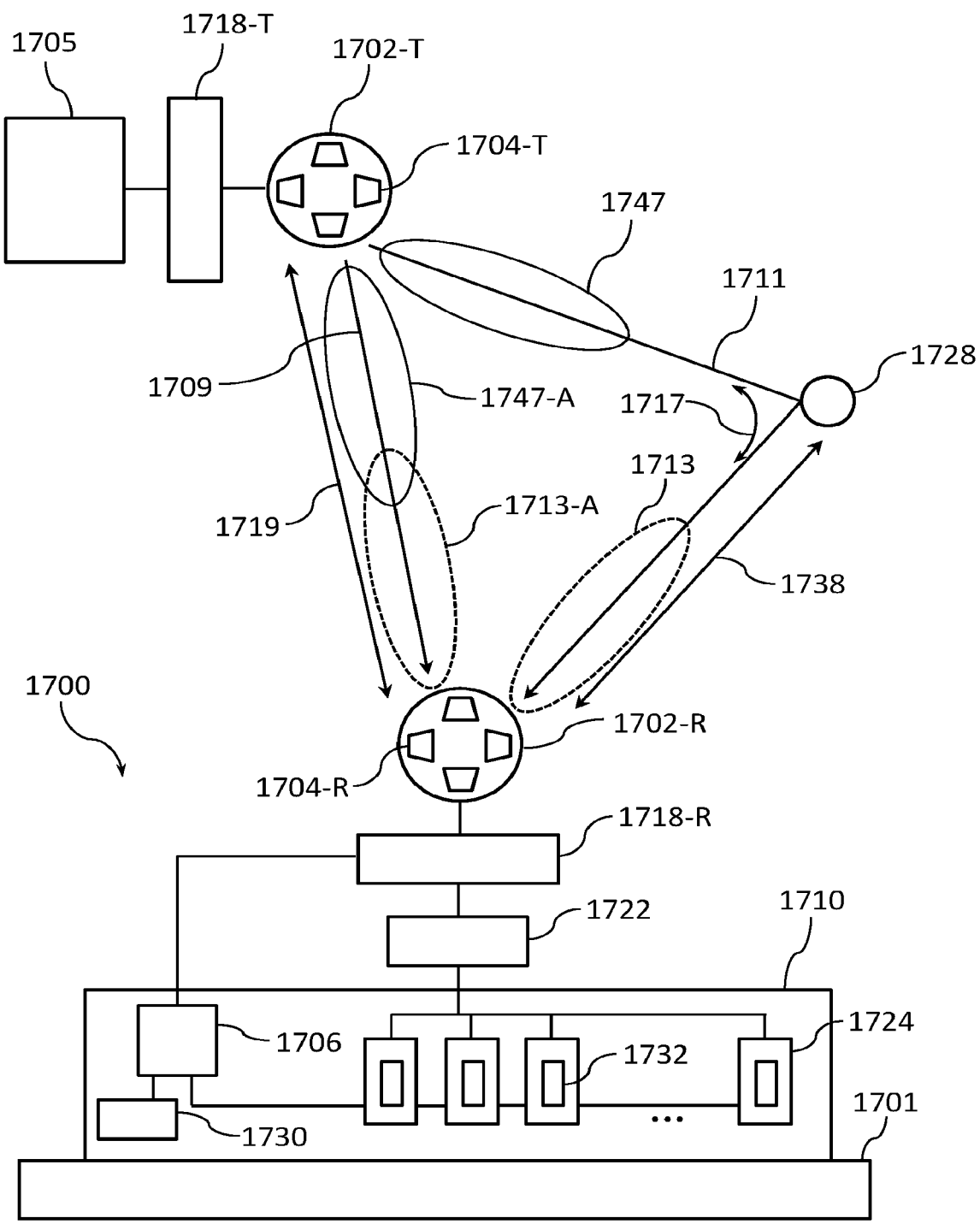
FIG. 17 shows a block diagram of an apparatus utilising signals from an external transmitter to characterise the environment of an associated user platform, according to yet another embodiment of the invention.

FIG. 17 depicts in schematic form an apparatus 1700 for characterising the environment of an associated user platform 1701 according to another embodiment of the present invention, using spread spectrum signals from an external transmitter 1705. In this embodiment the external transmitter is equipped with a transmit antenna array 1702-T having a plurality of spatially distributed transmit antenna elements 1704-T, and the apparatus 1700 is similarly equipped with a receive antenna array 1702-R having a plurality of spatially distributed receive antenna elements 1704-R. The presence of antenna arrays at both the transmitter 1705 and the apparatus 1700 enables the receiver 1710 to apply 'composite' beam forming techniques as described in U.S. Pat. No. 9,640,865. It should be noted that the two antenna arrays 1702-R and 1702-T do not need to have the same shape or the same number or type of antenna elements, although to form 'composite' beams correctly the receiver 1710 needs to know the configuration of both arrays. Spread spectrum signals generated by the external transmitter 1705 are broadcast through the transmit antenna elements 1704-T activated via a switching network 1718-T in a first predetermined sequence and received through the receive antenna elements 1704-R activated via a switching network 1718-R in a second predetermined sequence. The first predetermined sequence is known to the receiver 1710 either A. priori or from relevant information encoded in the transmitted signals, and the receiver can be expected to know the predetermined sequence of the local antenna array 1702-R. The receiver also needs to know the synchronisation of the signal to the first predetermined sequence, e.g. from the alignment of the PRN code to the first predetermined sequence.

After received incoming signals have been downconverted in an RF front end 1722, the receiver 1710 can apply, in one or more channels 1724, one or more sets of phase or gain manipulations in substantial synchronisation with the receipt of a signal transmitted from the activated transmit antenna elements 1704-T and in substantial synchronisation with the first predetermined sequence for activating the receive antenna elements 1704-R. The manipulated received signal in each channel 1724 is accumulated over an integration period to form the required 'composite' beam(s), with the integration period typically extending for at least one complete cycle of the longer of the first and second predetermined sequences. Each 'composite' beam can be thought of as a combination of a transmit beam 1747 or 1747-A pointing from the transmit array 1702-T and a receive beam 1713 or 1713-A pointing from the receive array 1702-R. In the example illustrated in FIG. 17 the receiver 1710 has formed two composite beams in two channels 1724. The first of these, corresponding to the direct path signal 1709, comprises a transmit beam 1747-A pointing from the transmit array 1702-T towards the receive array 1702-R and a receive beam 1713-A pointing from the receive array towards the transmit array. The second comprises transmit and receive beams 1747 and 1713 pointing from the respective antenna arrays towards a presumed object 1728, in directions that result in the reception at the receiver 1710 of a non-negligible or above threshold signal 1711 with the appropriate PRN code. The apparatus 1700 can characterise the environment of an associated user platform 1701 by sweeping one or more composite beams through an area of interest, or by forming a sufficient number of composite beams simultaneously to cover the area of interest, and looking for non-negligible or above threshold signals with the appropriate PRN code. That is, the apparatus looks for signals obtained by reflection of a signal transmitted from the transmitter 1705.

Once the apparatus has estimated the direction to a presumed object 1728 from the angle or direction of the 'receive' beam component 1713, the range 1738 can be estimated from the intersection of this direction with the bistatic range ellipse which can be determined from the range 1719 to the transmitter and the indirect signal path length 1717 as explained previously. The transmitter range 1719 can be determined from the positions of the apparatus 1700 and the transmitter 1705, leaving the indirect signal path length 1717 as the only parameter to be determined. If the receiver 1710 can track the indirect path signal 1711 then a pseudorange differencing method can be applied as described with reference to FIGS. 8 and 9. Preferably however, an approach similar to that described with reference to FIG. 15 is used. In this case the components of the phase or gain manipulations required for forming the 'transmit' portion 1747 of a composite beam are applied in multiple slave channels 1531-1 etc with incrementally increasing time offsets, and the components of the phase or gain manipulations required for forming the 'receive' portion 1713 of the composite beam are applied in each slave channel with the same timing as for the local array. In general the phase components for the respective portions of a composite beam will be summed and the gain components multiplied, and the set of combined phase or gain manipulations will be different in each slave channel 1531-1 etc as the 'transmit' components slide with respect to the 'receive' components. As before, there will be no need to delay the application of the phase or gain manipulations required for forming the transmit portion 1747 if the expected propagation time differences are insignificant compared to the activation period(s) for the transmit antenna elements 1704-T.

Figure 18:
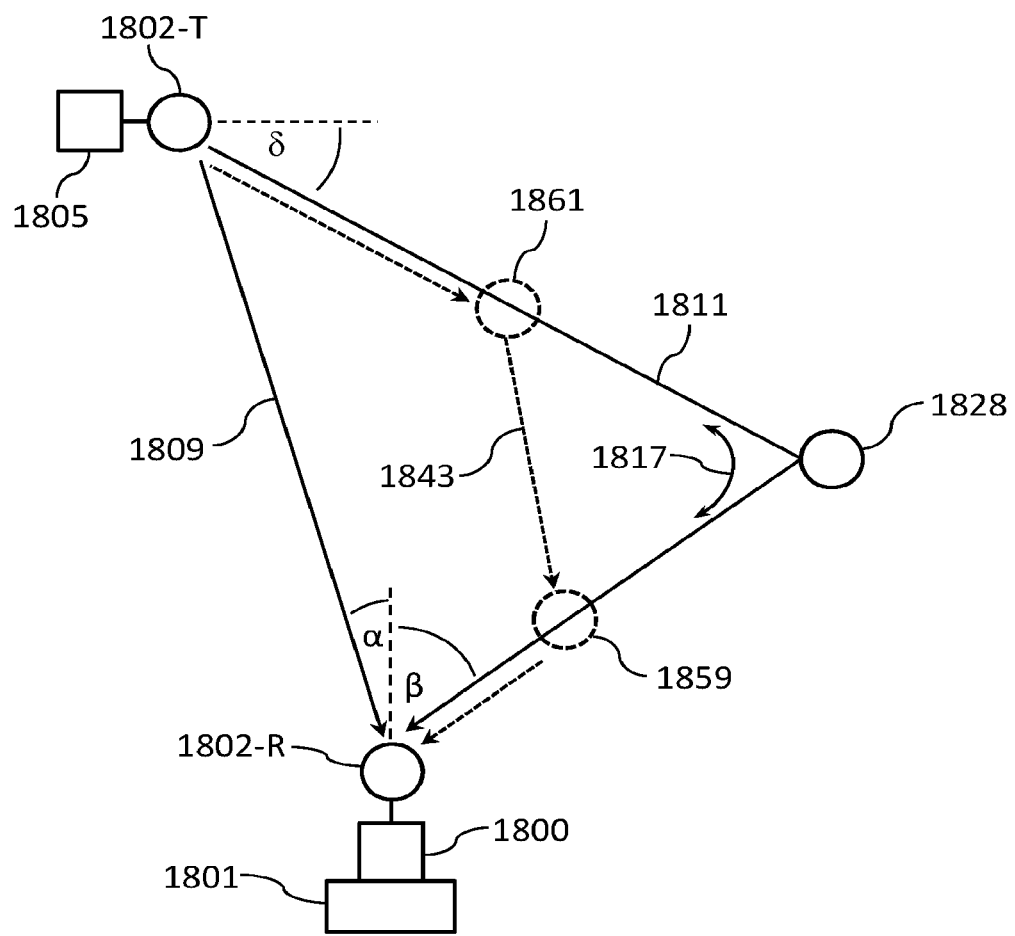
FIG. 18 illustrates the geometry of the apparatus shown in FIG. 17.

As shown in the geometry diagram of FIG. 18, the path lengths for the direct and indirect path signals 1809, 1811, along with the angles α, β and δ obtained from the composite beams, are sufficient for an apparatus 1800 to obtain estimates of direction and range to a presumed object 1828. Furthermore the additional angle information provided by a composite beam allows characterisation of the environment with greater certainty. For example the possibility of a double reflection path 1843 involving two objects 1859 and 1861 can be ruled out because its length is too short. Paths involving three or more reflections involving angles δ and β, and with total length equal to the length 1817 of the single reflection path 1811 can be envisaged, but the reception of non-negligible signals along such paths becomes increasingly unlikely. Furthermore in many circumstances the presence or absence of inferred objects can be confirmed by cross-checking candidate positions determined from composite beams formed in other directions, using signals from the same transmitter 1805 or other transmitters.

For each of the systems depicted in FIGS. 8, 12 and 17 the external transmitter 805, 1205 or 1705 is preferably one of a plurality of similar transmitters in known locations forming a positioning network, within which an apparatus 800, 1200 or 1700 can calculate PVT solutions. This can be performed as part of or in addition to the environment characterisation function. For example the apparatus 800 of FIG. 8 can form a number of beams 813-A directed toward a like number of transmitters 805 for receiving a sufficient number of signals to calculate a PVT solution, and one or more beams 813 in other directions to look for reflections from objects 828 in the environment. Similarly, the apparatus 1200 of FIG. 12 can form a number of beams 1247-A pointing from a like number of transmitter arrays 1202 towards itself for position determination, and one or more beams 1247 in other directions to look for reflections from objects 1228 in the environment.

The apparatus 1200 described above with reference to FIG. 12 is particularly advantageous since its utilisation of remote beamforming techniques allows it to characterise the environment of an associated user platform 1201 without requiring a multi-element antenna array, enabling miniaturisation to a hand-held device. The apparatus 1700 of FIG. 17 is also advantageous because its utilisation of composite beamforming techniques reduces the likelihood of object range ambiguities. Significantly, the systems depicted in FIGS. 12 and 17 are multiple-access, meaning any number of user platforms 1201 or 1701 with suitable apparatus 1200 or 1700 can operate within a network of one or more antenna array-equipped transmitters 1205, 1705. This is because all of the signal manipulations required to characterise the environment, or to determine PVT solutions, are performed within the respective receivers of the apparatus. If on the other hand the apparatus of a given user platform were to instruct an antenna array-equipped external transmitter, e.g. via wired or wireless means, to form one or more beams in certain directions for its own use, the apparatus of other user platforms would be denied access to that transmitter. Accordingly, the system depicted in FIG. 12 provides a multiple-access method in which a plurality of user platforms 1201 with suitable apparatus 1200 equipped with simple antennas 1207 can characterise their environment utilising signals received from one or more external transmitters 1205 equipped with multi-element antenna arrays 1202.

A small number of embodiments of the invention have been described regarding methods and apparatus for characterising the environment of a user platform by transmission, reception and processing of signals. For simplicity the signal processing has been described in terms of elements such as channels, correlators and taps that can be implemented in hardware within a receiver. However it will be appreciated that with modern computer processors these and other elements can also be implemented in software, providing great flexibility in the assignment of resources for processing received signals. In general the signal processing may occur in any combination of hardware, firmware and software without departing from the scope of the appended claims.

Although the invention has been described with reference to specific examples, it will be appreciated by those skilled in the art that the invention may be embodied in many other forms.

What is claimed is:

1. A method for characterising the environment of a user platform, said method comprising the steps of:
generating a signal;
transmitting said signal through spatially distributed antenna elements of an antenna array, said antenna elements being activated in a predetermined sequence for transmitting or receiving signals;

applying to incoming signals received through the sequentially activated antenna elements, in substantial synchronisation with said predetermined sequence, phase or gain manipulations incorporating round-trip path corrections for said antenna array and selected for forming a reciprocal beam of said antenna array in a predetermined direction;

accumulating the manipulated incoming signals over an integration period to form said reciprocal beam; and inferring the presence of an object in said predetermined direction based on the detection in said reciprocal beam of a return of the transmitted signal.

2. The method according to claim 1, wherein said phase or gain manipulations are applied to said incoming signals in substantial synchronisation with said predetermined sequence, and in substantial synchronisation with expected periods of receipt of a return signal.

3. The method according to claim 2, wherein said integration period is divided into a number of sub-integration periods that are determined by the overlap of the expected periods of receipt of a return signal and the activation periods of said antenna elements.

4. The method according to claim 1, wherein the detection of said return of the transmitted signal comprises correlating incoming signals against a replica of a code used to encode said transmitted signal.

5. The method according to claim 1, further comprising the steps of:
receiving a local signal obtained internally from the generated signal being transmitted; and
tracking said local signal in a first channel to determine a baseline for a measurement of range to the inferred object.

6. The method according to claim 5, further comprising the steps of:
correlating, in a plurality of taps at a series of delays in said first channel, incoming signals against a replica of a code used to encode said transmitted signal, to determine a plurality of correlation values;
identifying a maximum correlation value from said plurality of correlation values; and
determining, from a separation between said baseline and said maximum correlation value, a measure related to range to said inferred object.

7. The method according to claim 5, further comprising the steps of:
correlating, in a plurality of taps at a series of delays in one or more channels that are slaved to said first channel, incoming signals against a replica of a code used to encode said transmitted signal, to determine a plurality of correlation values;
identifying a maximum correlation value from said plurality of correlation values; and
determining, from a separation between said baseline and said maximum correlation value, a measure related to range to said inferred object.

8. The method according to claim 5, wherein said local signal is accumulated during periods when the generated signal is being transmitted, and said manipulated incoming signals are accumulated during periods when said generated signal is not being transmitted.

9. An apparatus for characterising the environment of a user platform, said apparatus comprising:
an antenna array having a plurality of spatially distributed antenna elements;
a switching network for activating said antenna elements in a predetermined sequence for transmitting or receiving signals;
a transmitter operatively associated with said antenna array for generating a signal and transmitting said signal through the sequentially activated antenna elements; and
a receiver operatively associated with said antenna array for:
receiving incoming signals through said sequentially activated antenna elements;
applying phase or gain manipulations to received incoming signals in substantial synchronisation with said predetermined sequence, said phase or gain manipulations incorporating round-trip path corrections for said antenna array and being selected for forming a reciprocal beam of said antenna array in a predetermined direction;
accumulating the manipulated incoming signals over an integration period to form said reciprocal beam; and
inferring the presence of an object in said predetermined direction based on the detection in said reciprocal beam of a return of the transmitted signal.

10. The apparatus according to claim 9, wherein said receiver is adapted to apply said phase or gain manipulations to said incoming signals in substantial synchronisation with said predetermined sequence, and in substantial synchronisation with expected periods of receipt of a return signal.

11. The apparatus according to claim 10, wherein said integration period is divided into a number of sub-integration periods that are determined by the overlap of the expected periods of receipt of a return signal and the activation periods of said antenna elements.

12. The apparatus according to claim 9, wherein said receiver comprises a correlator for correlating incoming signals against a replica of a code used to encode said transmitted signal, for the detection of said return of the transmitted signal.

13. The apparatus according to claim 9, wherein said receiver is adapted to:
receive a local signal obtained internally from the generated signal being transmitted; and
track said local signal in a first channel to determine a baseline for a measurement of range to the inferred object.

14. The apparatus according to claim 13, wherein said receiver is adapted to:
correlate, in a plurality of taps at a series of delays in said first channel, incoming signals against a replica of a code used to encode said transmitted signal, to determine a plurality of correlation values;
identify a maximum correlation value from said plurality of correlation values; and
determine, from a separation between said baseline and said maximum correlation value, a measure related to range to said inferred object.

15. The apparatus according to claim 13, wherein said receiver is adapted to:
correlate, in a plurality of taps at a series of delays in one or more channels that are slaved to said first channel, incoming signals against a replica of a code used to encode said transmitted signal, to determine a plurality of correlation values;
identify a maximum correlation value from said plurality of correlation values; and
determine, from a separation between said baseline and said maximum correlation value, a measure related to range to said inferred object.

16. The apparatus according to claim 13, wherein said receiver is adapted to accumulate said local signal during periods when the generated signal is being transmitted, and accumulate said manipulated incoming signals during periods when said generated signal is not being transmitted.

17. A method for forming a reciprocal beam at an antenna array, said method comprising the steps of:
generating a signal;
transmitting said signal through spatially distributed antenna elements of said antenna array, said antenna elements being activated in a predetermined sequence for transmitting or receiving signals;
applying to incoming signals received through the sequentially activated antenna elements, in substantial synchronisation with said predetermined sequence, phase or gain manipulations incorporating round-trip path corrections for said antenna array and selected for forming a reciprocal beam of said antenna array in a predetermined direction; and
accumulating the manipulated incoming signals over an integration period to form said reciprocal beam.

18. An apparatus for forming a reciprocal beam at an antenna array, said apparatus comprising:
an antenna array having a plurality of spatially distributed antenna elements;
a switching network for activating said antenna elements in a predetermined sequence for transmitting or receiving signals;
a transmitter operatively associated with said antenna array for generating a signal and transmitting said signal through the sequentially activated antenna elements; and
a receiver operatively associated with said antenna array for:
receiving incoming signals through said sequentially activated antenna elements;
applying phase or gain manipulations to received incoming signals in substantial synchronisation with said predetermined sequence, said phase or gain manipulations incorporating round-trip path corrections for said antenna array and being selected for forming a reciprocal beam of said antenna array in a predetermined direction; and
accumulating the manipulated incoming signals over an integration period to form said reciprocal beam.

* * * * *